United States Patent
Kollmuss et al.

(10) Patent No.: US 11,220,000 B2
(45) Date of Patent: Jan. 11, 2022

(54) HANDLING SYSTEM AND METHOD FOR HANDLING PIECE GOODS

(71) Applicant: KRONES Aktiengesellschaft, Neutraubling (DE)

(72) Inventors: Manuel Kollmuss, Raubling (DE); Erhard Beer, Ebbs (AT); Michael Astner, Brannenburg (DE); Arsalan Mehdi, Rosenheim (DE)

(73) Assignee: KRONES Aktiengesellschaft, Neutraubling (DE)

( * ) Notice: Subject to any disclaimer, the term of this patent is extended or adjusted under 35 U.S.C. 154(b) by 424 days.

(21) Appl. No.: 16/469,727

(22) PCT Filed: Feb. 21, 2017

(86) PCT No.: PCT/EP2017/053886
§ 371 (c)(1),
(2) Date: Jun. 14, 2019

(87) PCT Pub. No.: WO2018/114060
PCT Pub. Date: Jun. 28, 2018

(65) Prior Publication Data
US 2020/0078934 A1    Mar. 12, 2020

(30) Foreign Application Priority Data

Dec. 22, 2016    (DE) ................... 10 2016 125 361.8

(51) Int. Cl.
*B25J 9/16*    (2006.01)
*B25J 9/00*    (2006.01)
(Continued)

(52) U.S. Cl.
CPC ............ *B25J 9/0093* (2013.01); *B25J 9/003* (2013.01); *B25J 9/1674* (2013.01); *B25J 9/1687* (2013.01);
(Continued)

(58) Field of Classification Search
CPC ........ B25J 9/003; B25J 9/0093; B25J 9/1674; B25J 9/1687; B25J 9/1697; B65G 43/00;
(Continued)

(56) References Cited

U.S. PATENT DOCUMENTS

| | | |
|---|---|---|
| 5,123,231 A | 6/1992 | Fallas et al. |
| 6,282,461 B1 | 8/2001 | Gan et al. |

(Continued)

FOREIGN PATENT DOCUMENTS

| | | |
|---|---|---|
| DE | 203414 A1 | 10/1983 |
| DE | 20108401 U1 | 9/2002 |

(Continued)

OTHER PUBLICATIONS

PCT-Application: PCT/EP2017/053886 dated Feb. 21, 2017—International Search Report dated Jun. 13, 2017.

(Continued)

*Primary Examiner* — Dale Moyer
(74) *Attorney, Agent, or Firm* — Simmons Perrine Moyer Bergman PLC

(57) ABSTRACT

The invention includes a method and a handling system for manipulating and/or for handling piece goods (2) moved one after another in at least one row (1, 1a, 1b) in a transport direction (TR) on a horizontal conveying device (6). In each work cycle, seizing at least one transported piece good (2) from the at least one row (1, 1a, 1b) by at least one handling device (10); spatially separating it from the row (1, 1a, 1b); and bringing it into a specified relative target position and/or target alignment relative to subsequent piece goods (2). After a failure event with an at least a temporary standstill of the horizontal conveying device (6) and/or of the handling device (10), the handling device (10) is initialized, and, after (Continued)

the failure has been remedied, the horizontal conveying device (6) automatically restarts and continues the previously interrupted process.

15 Claims, 22 Drawing Sheets

(51) Int. Cl.
*B65G 43/00* (2006.01)
*B65G 47/22* (2006.01)

(52) U.S. Cl.
CPC ............ *B25J 9/1697* (2013.01); *B65G 43/00* (2013.01); *B65G 47/22* (2013.01); *B65G 2203/0225* (2013.01); *B65G 2203/0233* (2013.01); *B65G 2203/0291* (2013.01)

(58) Field of Classification Search
CPC ...... B65G 43/02; B65G 47/086; B65G 47/22; B65G 2203/0225; B65G 2203/0233; B65G 2203/0291
See application file for complete search history.

(56) References Cited

U.S. PATENT DOCUMENTS

| | | | |
|---|---|---|---|
| 7,844,328 B2 | 11/2010 | Nemoto | |
| 8,448,411 B2 | 5/2013 | Huber et al. | |
| 8,931,617 B2 | 1/2015 | Gut | |
| 9,676,560 B2 | 6/2017 | Senn et al. | |
| 9,906,110 B2 | 2/2018 | Sommerhalter, Jr. | |
| 2004/0199076 A1* | 10/2004 | Nemoto | G16H 30/40 600/432 |
| 2005/0246056 A1 | 11/2005 | Marks et al. | |
| 2010/0152894 A1 | 6/2010 | Ha | |
| 2010/0276248 A1* | 11/2010 | Gut | B65G 47/46 198/370.02 |
| 2011/0016831 A1* | 1/2011 | Huber | B65B 35/44 53/448 |
| 2016/0164395 A1* | 6/2016 | Sommerhalter, Jr. | H02K 41/031 310/12.11 |
| 2016/0194157 A1* | 7/2016 | Senn | B65G 54/02 414/467 |
| 2021/0276756 A1* | 9/2021 | Dunkel | B25J 11/0045 |

FOREIGN PATENT DOCUMENTS

| | | |
|---|---|---|
| DE | 102009043970 A1 | 3/2011 |
| DE | 102010020847 A1 | 11/2011 |
| DE | 102011080812 A1 | 2/2013 |
| DE | 102013204095 A1 | 9/2014 |
| DE | 102013106004 A1 | 12/2014 |
| EP | 1456101 A1 | 9/2004 |
| EP | 1927559 A1 | 6/2008 |
| FR | 2993870 A1 | 1/2014 |
| WO | 2015014559 A1 | 2/2015 |
| WO | 2016094923 A3 | 8/2016 |

OTHER PUBLICATIONS

PCT Application: PCT/EP2017/053886 Filed Feb. 21, 2017—WIPO International Preliminary Report of Patentability dated Jul. 4, 2019.
Priority Application: DE 10 2016 125 361.8 Filed Dec. 22, 2016—German Search Report dated Jul. 2, 2021.
Corresponding Chinese Application No. CN201780046576.3—Mar. 16, 2020 English Translation of First Chinese Office Action.
Corresponding Chinese Application No. CN201780046576.3—Sep. 22, 2020 English Translation of Second Chinese Office Action.
Corresponding Chinese Application No. CN201780046576.3—Mar. 22, 2021 English Translation of Third Chinese Office Action.
Corresponding Chinese Application No. CN201780046576.3—Aug. 24, 2021 English Translation of Chinese Intention to Grant.
First Chinese Office Action dated Mar. 16, 2020.

* cited by examiner

Fig. 1

| S1 | Conveyance of piece goods one after another in rows in conveying direction on a horizontal conveying device |
| S2 | Seizure of a piece good or of a plurality of piece goods by handling device and spatial separation from the row |
| S3 | Transfer of the piece good or of the piece goods into new target position (with new alignment after rotation, as the case may be) and further conveyance in the previous conveying direction |
| S4 | Occurrence of a failure that leads to standstill of the horizontal conveying device and of the handling device |
| S5 | Detection and storage of all positions of the piece goods located in the seizing range of the handling device and availability of the position data to a control unit |
| S6 | (Re-)initialization of the handling device |
| S7 | Restart of the horizontal conveying device and continuation of the interrupted handling process and position changing process |
| S8 | Completion of the previously interrupted work cycle; as the case may be, at reduced speeds (of the horizontal conveying device and/or of the handling device) |

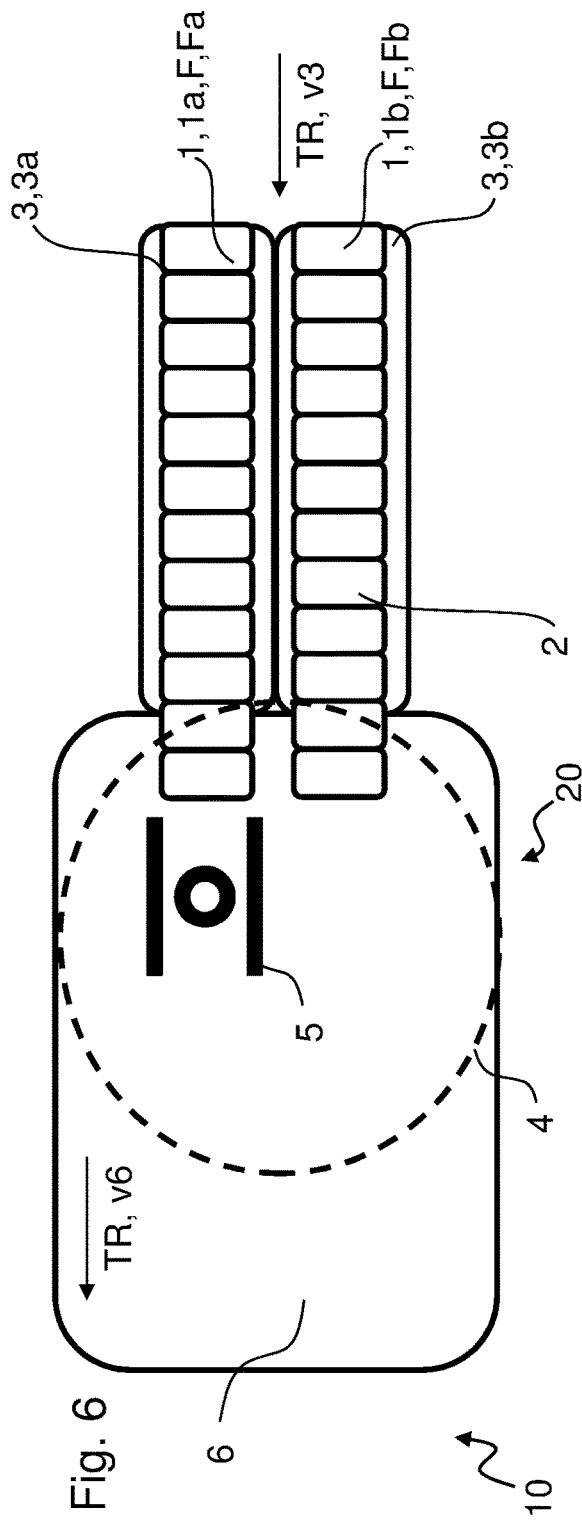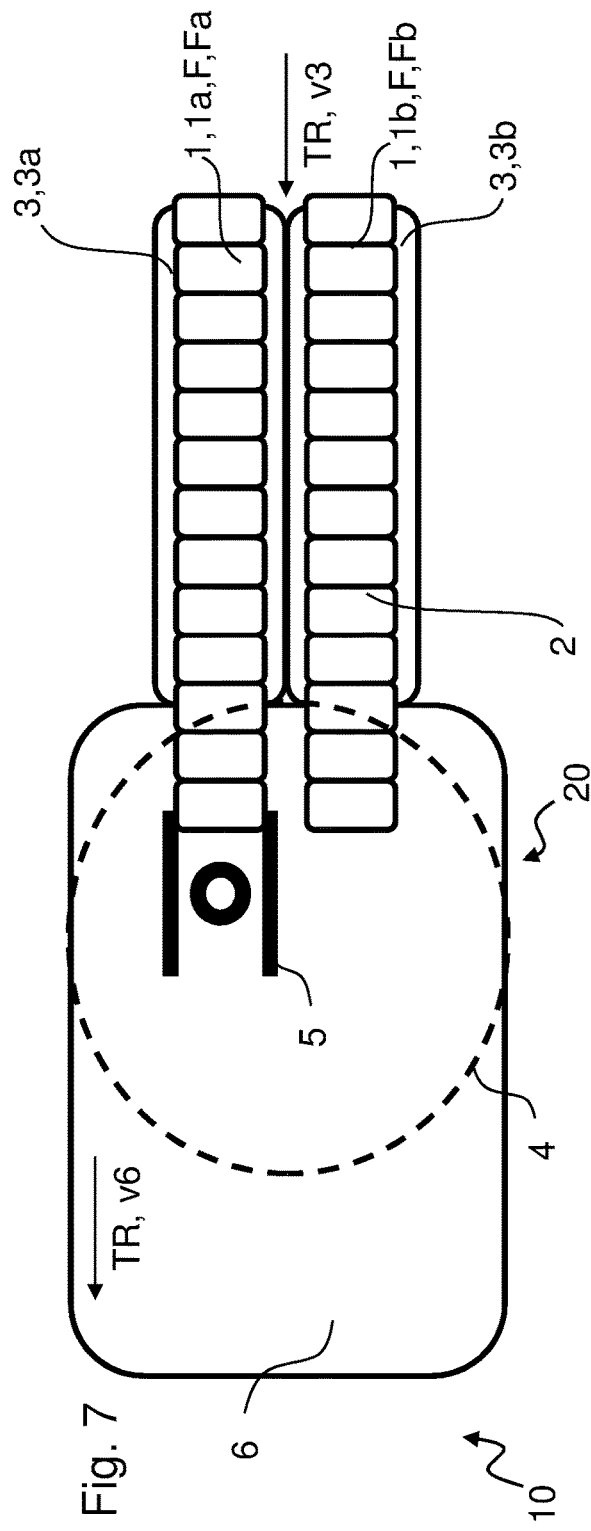

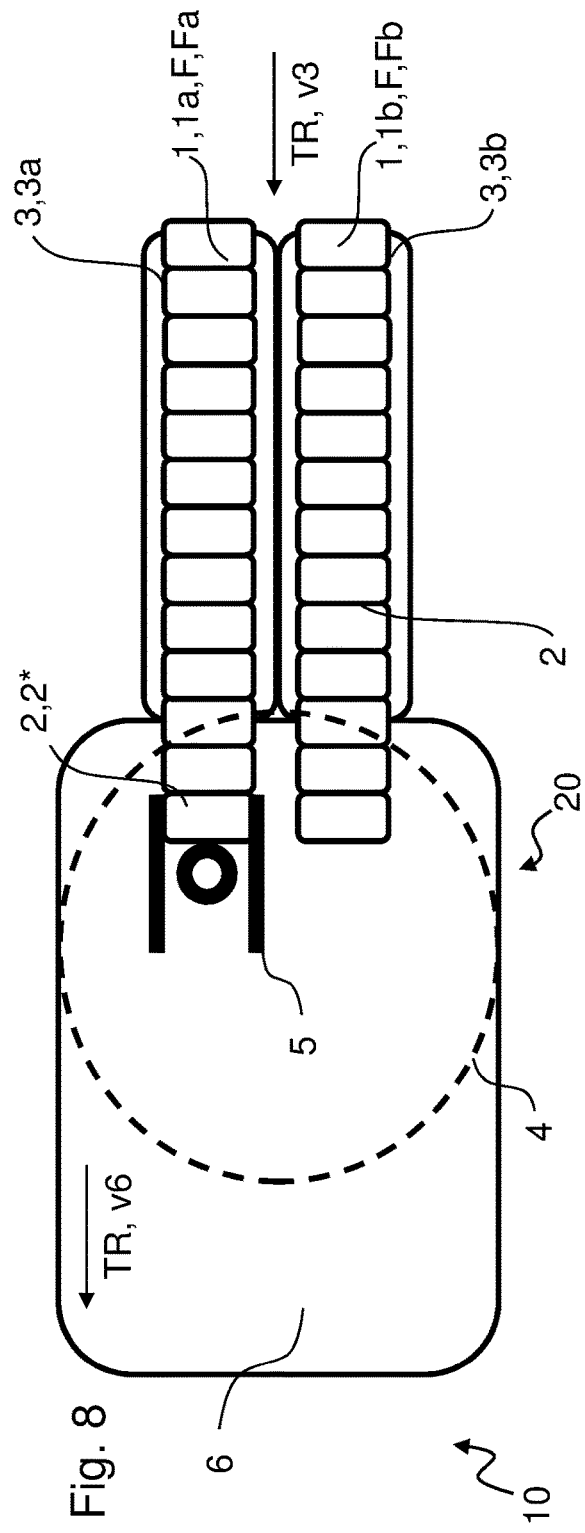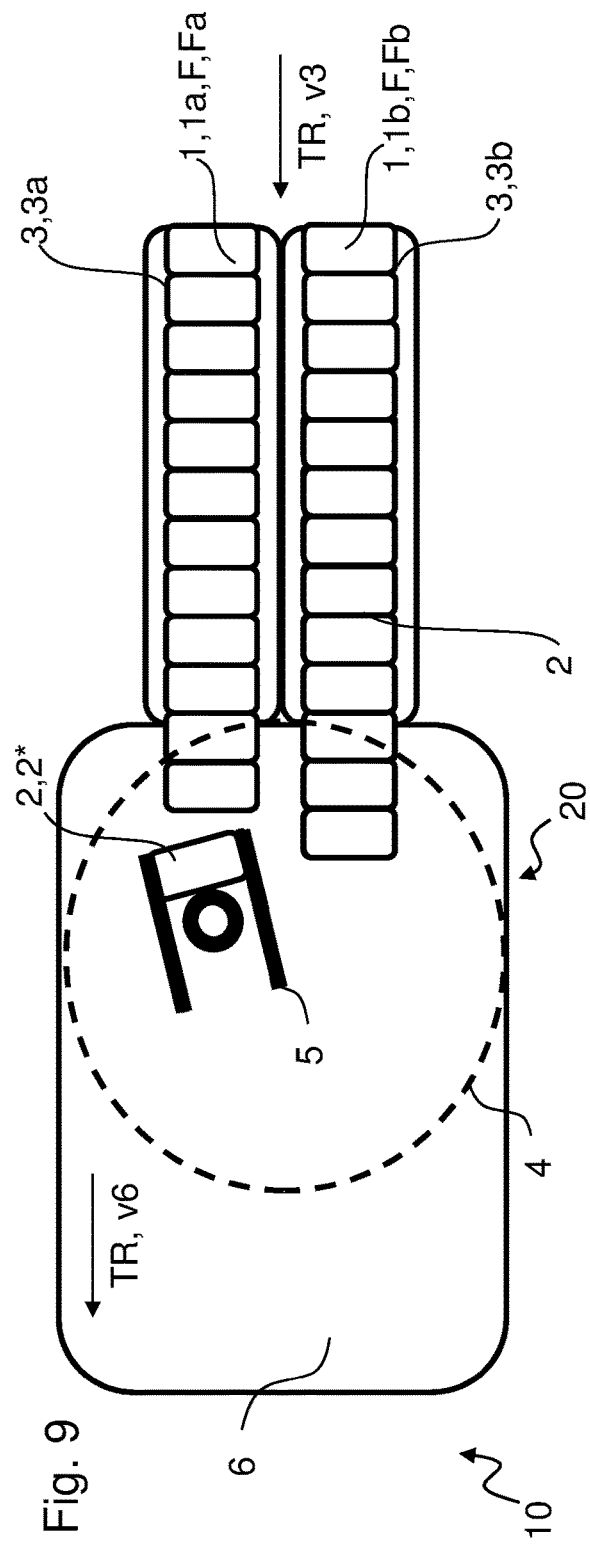

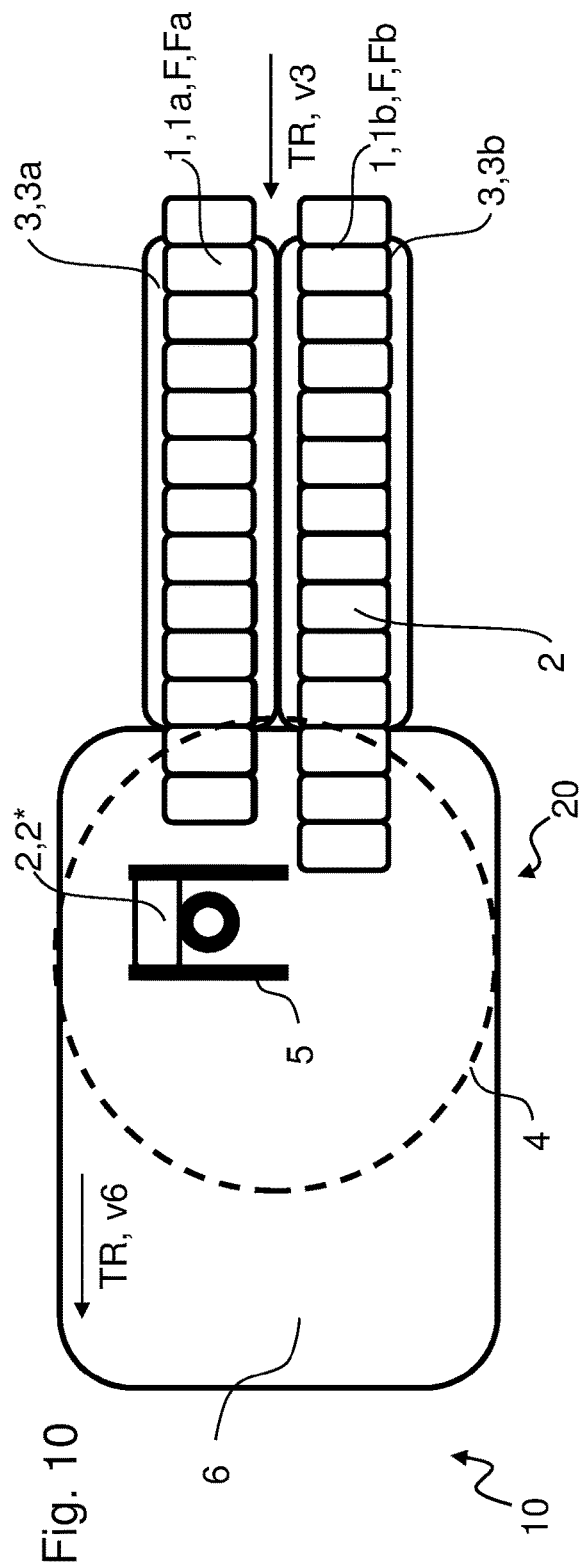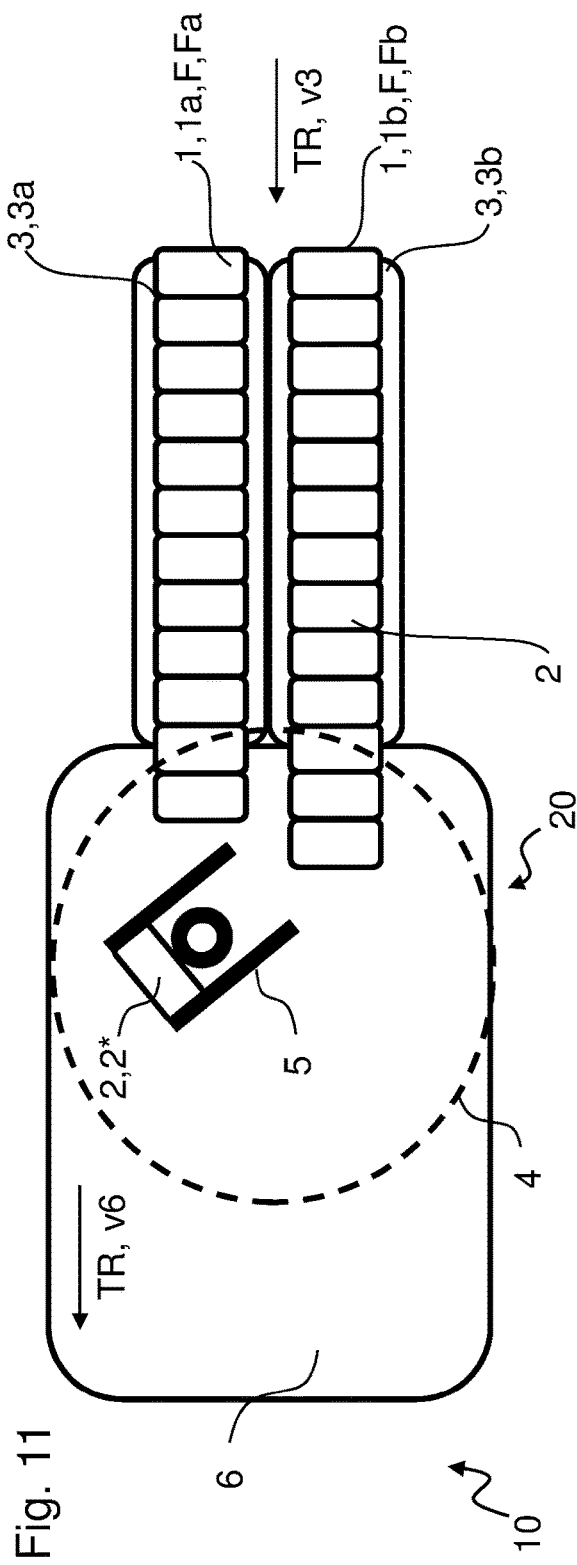

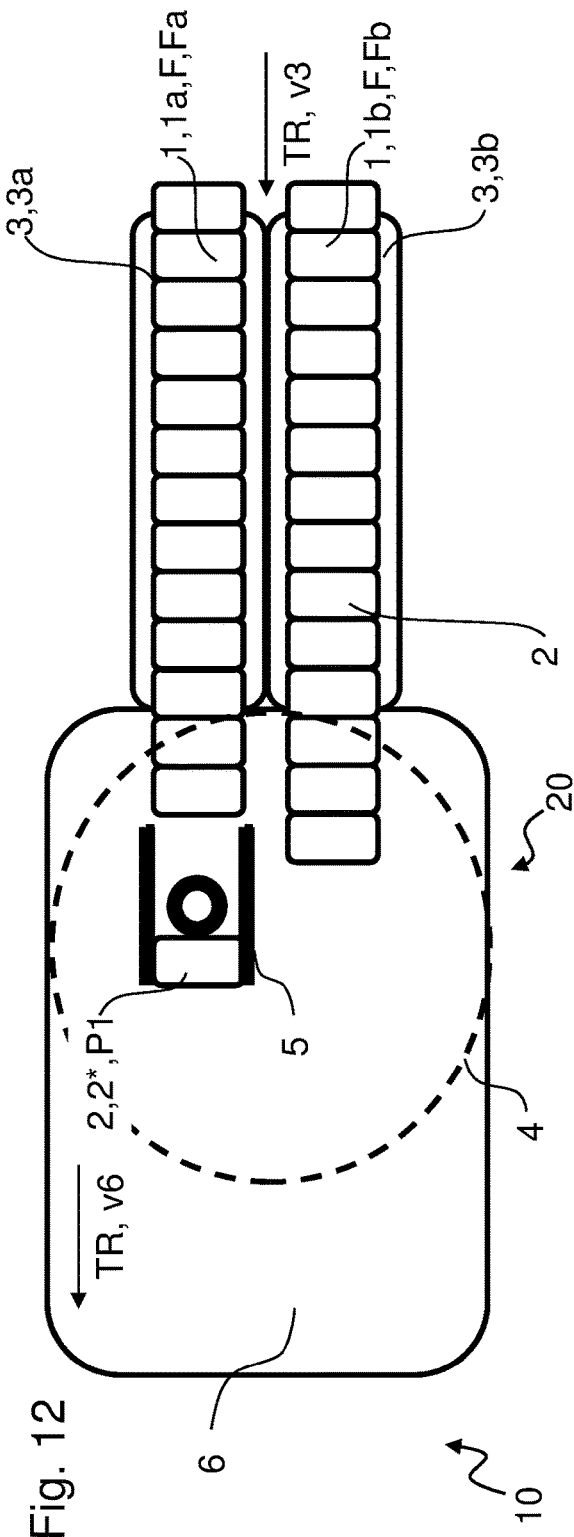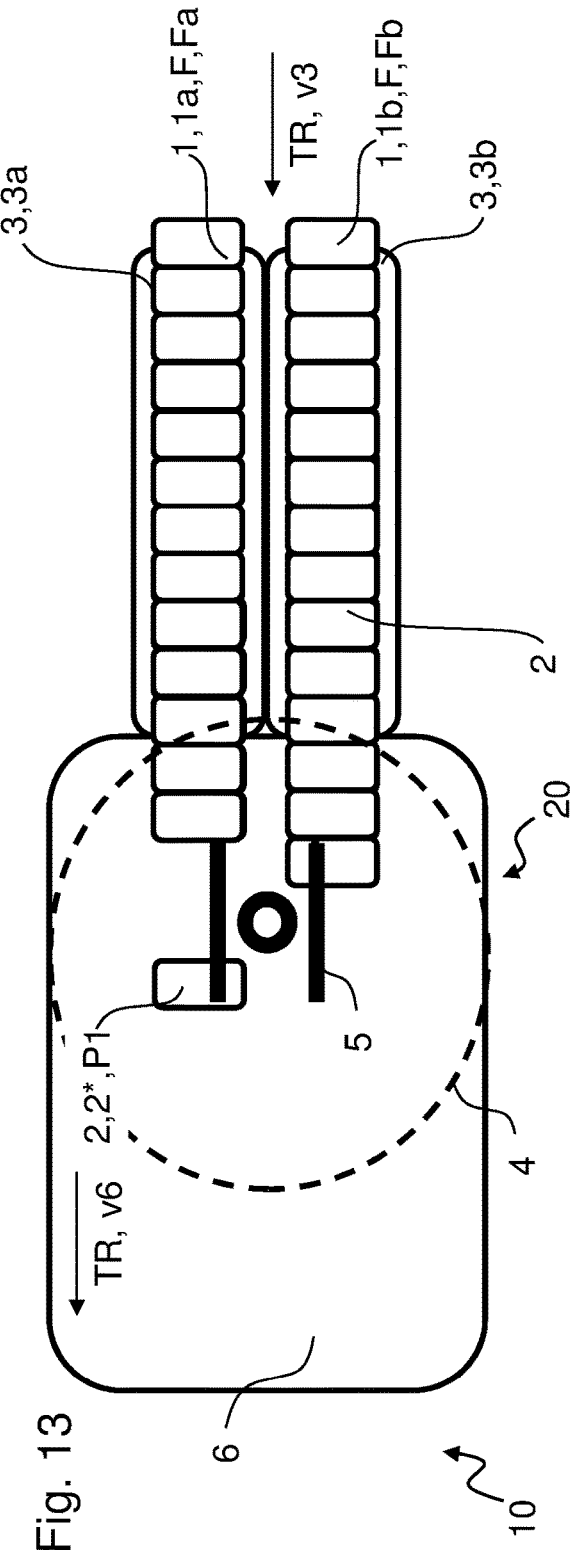

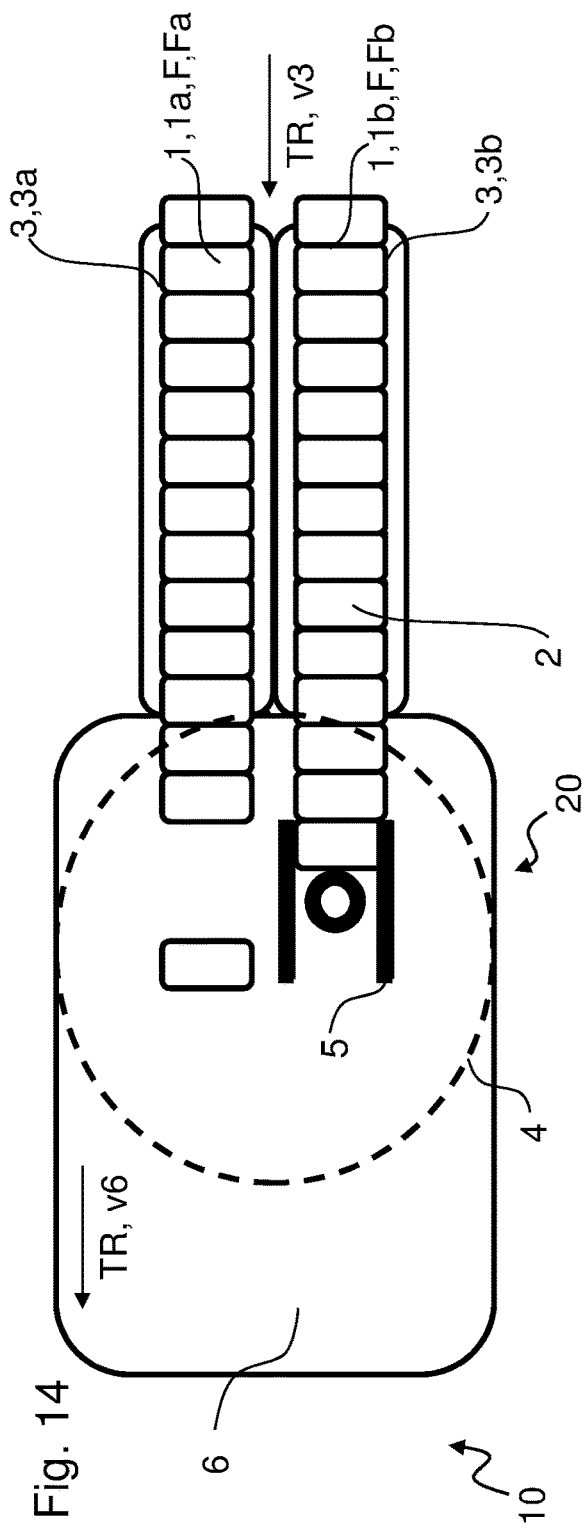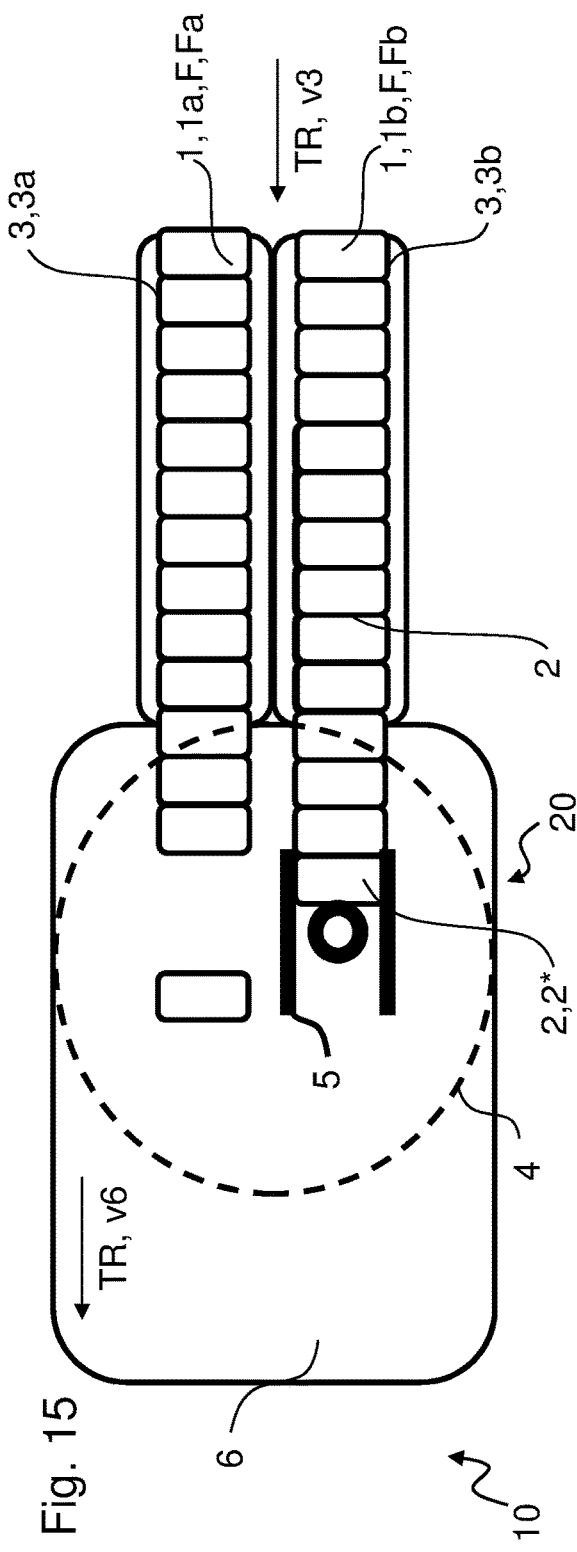

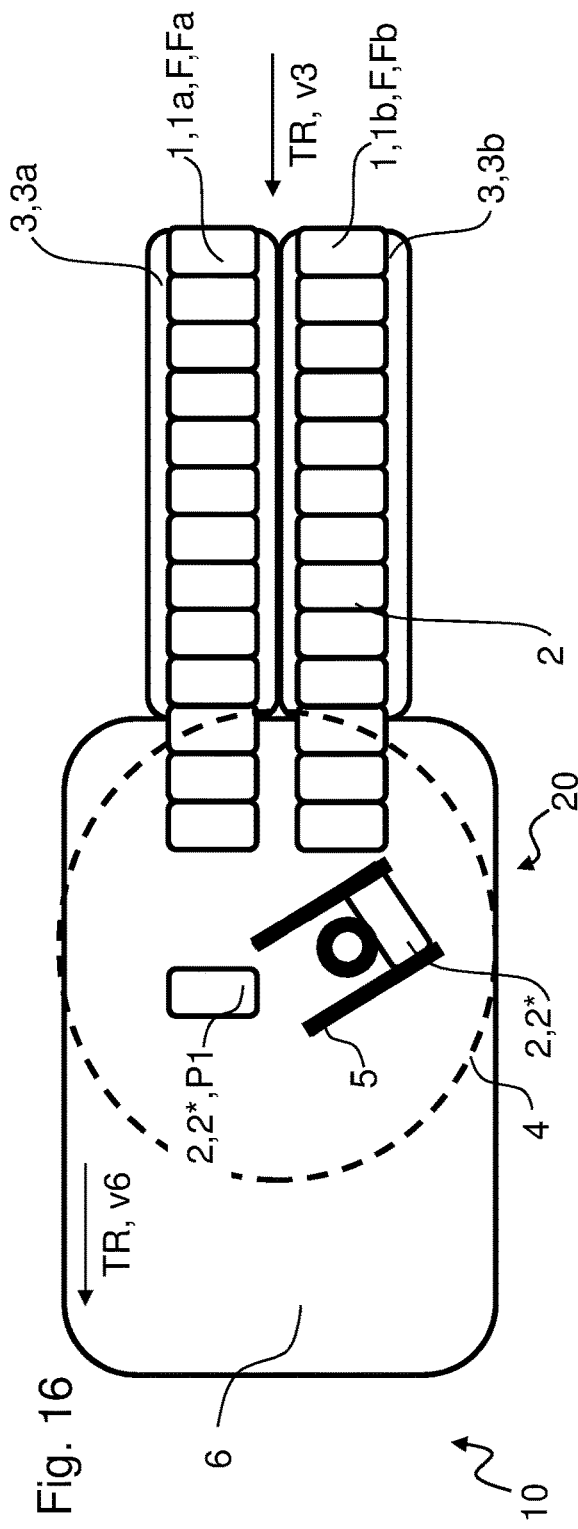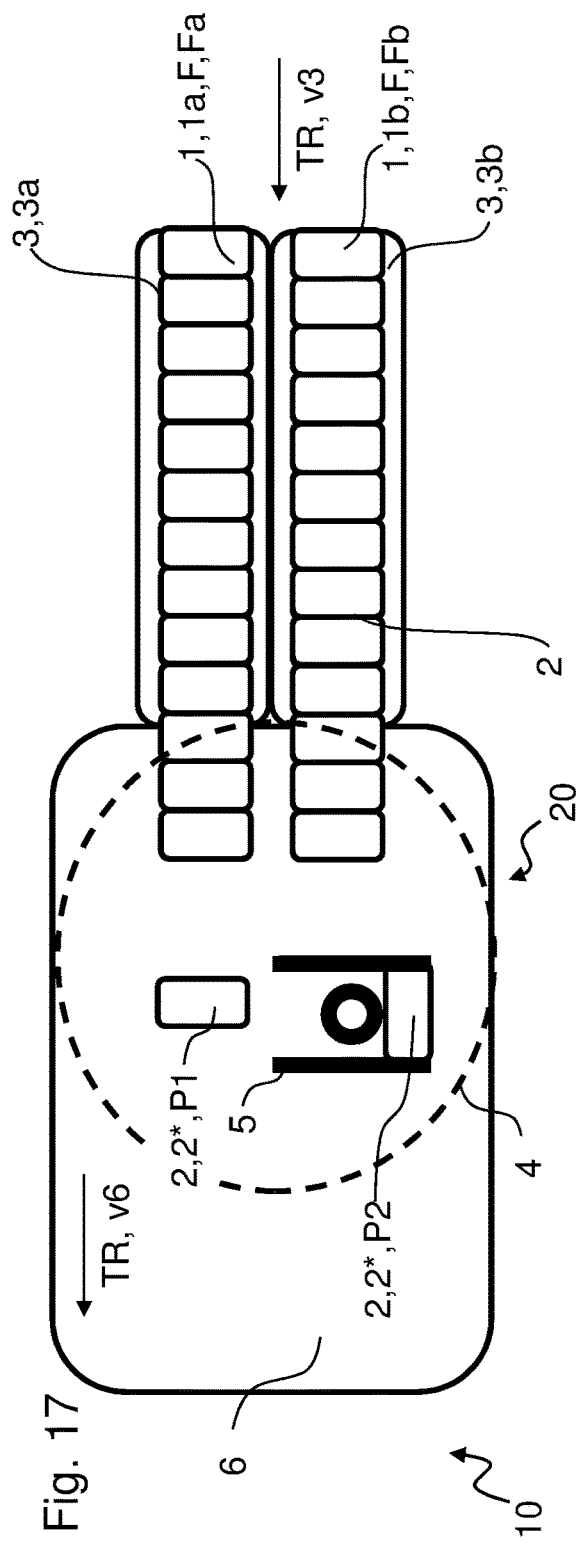

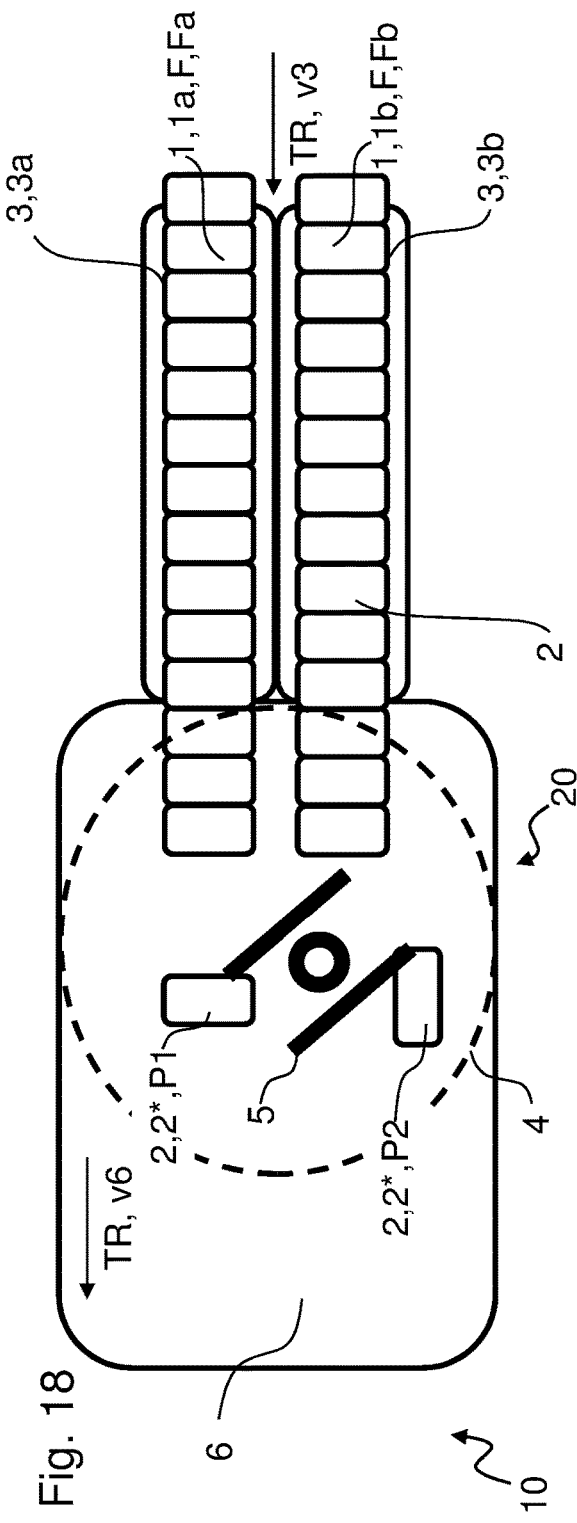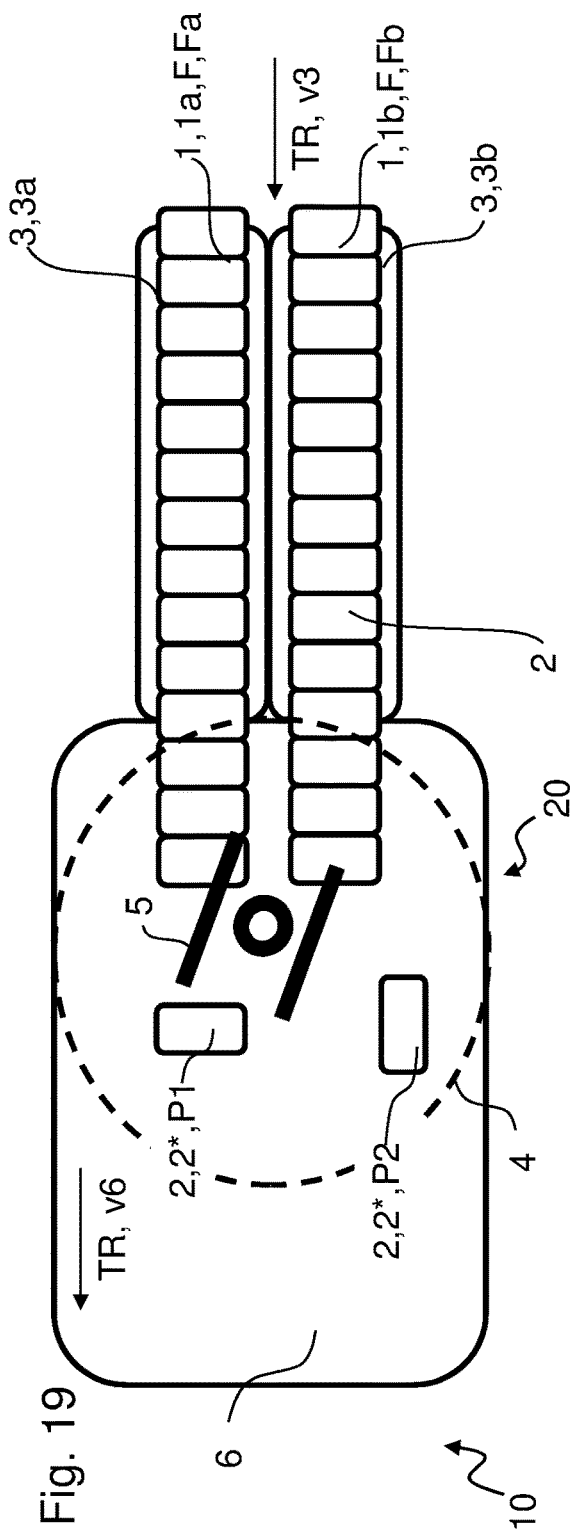

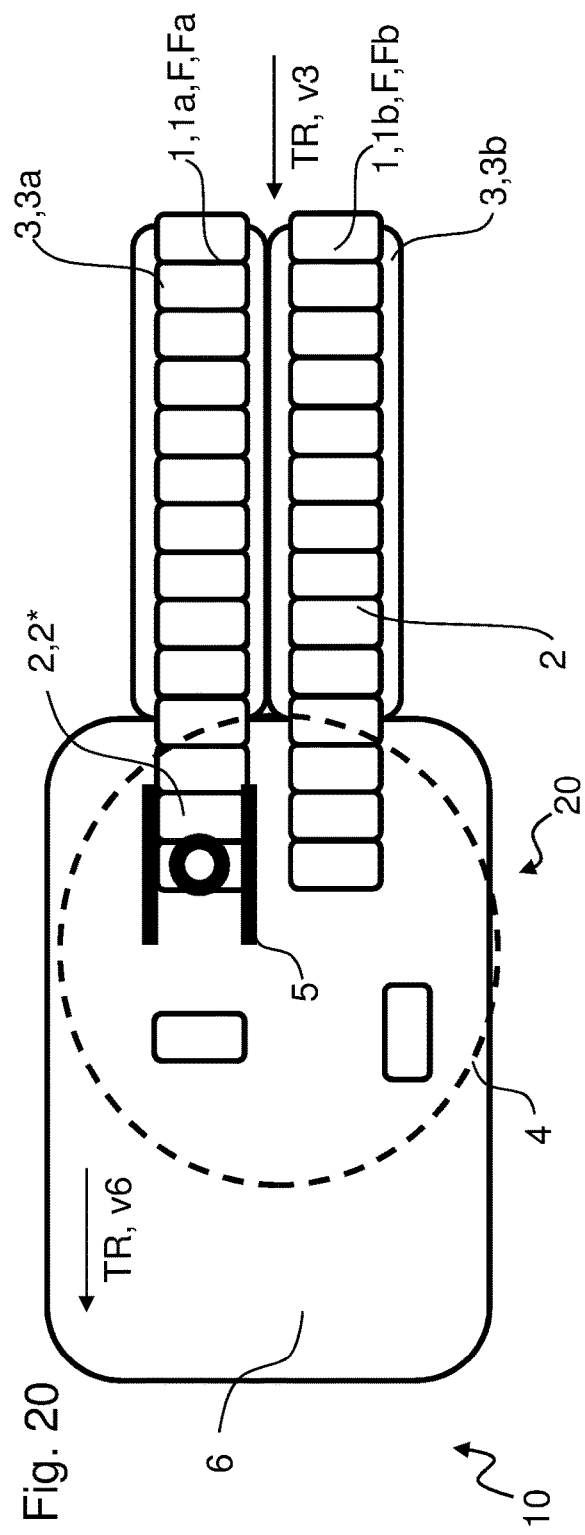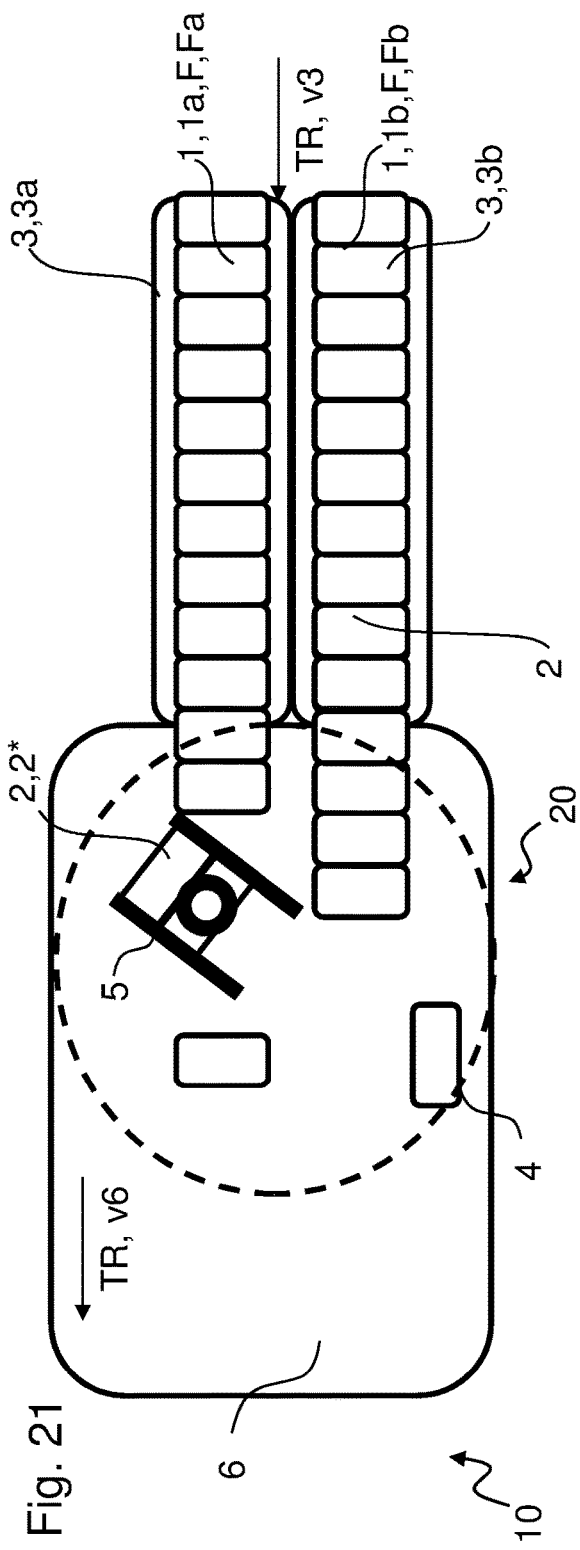

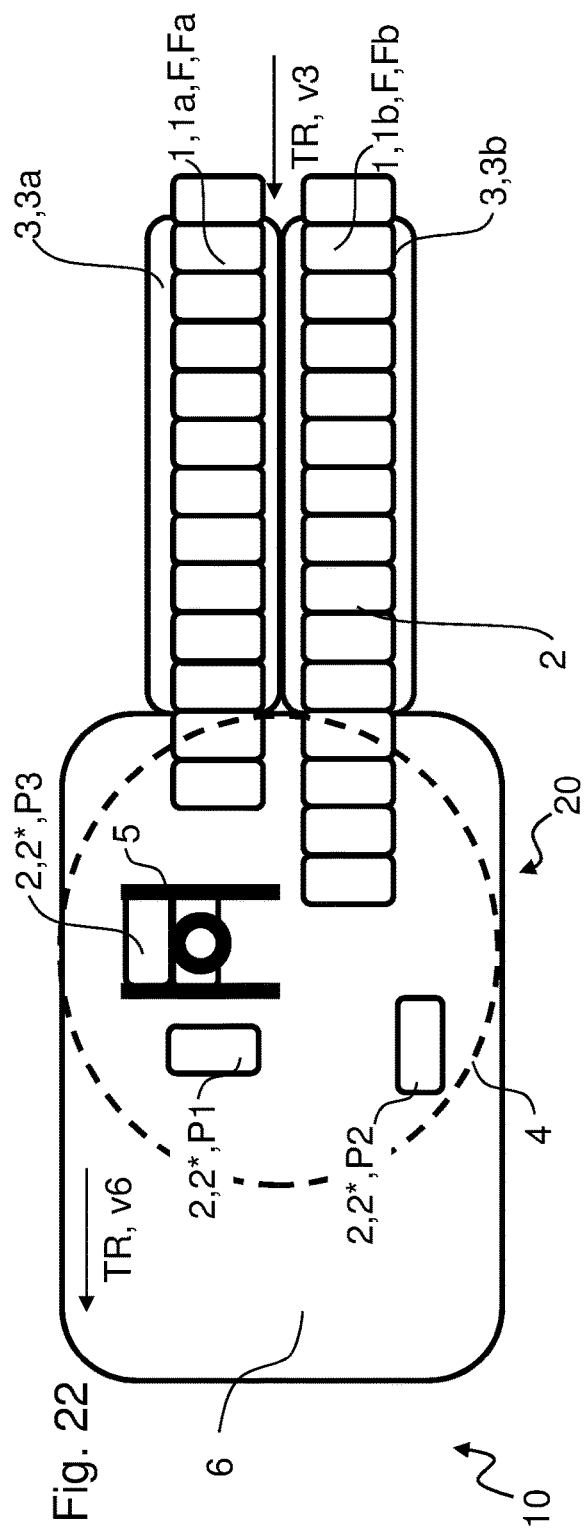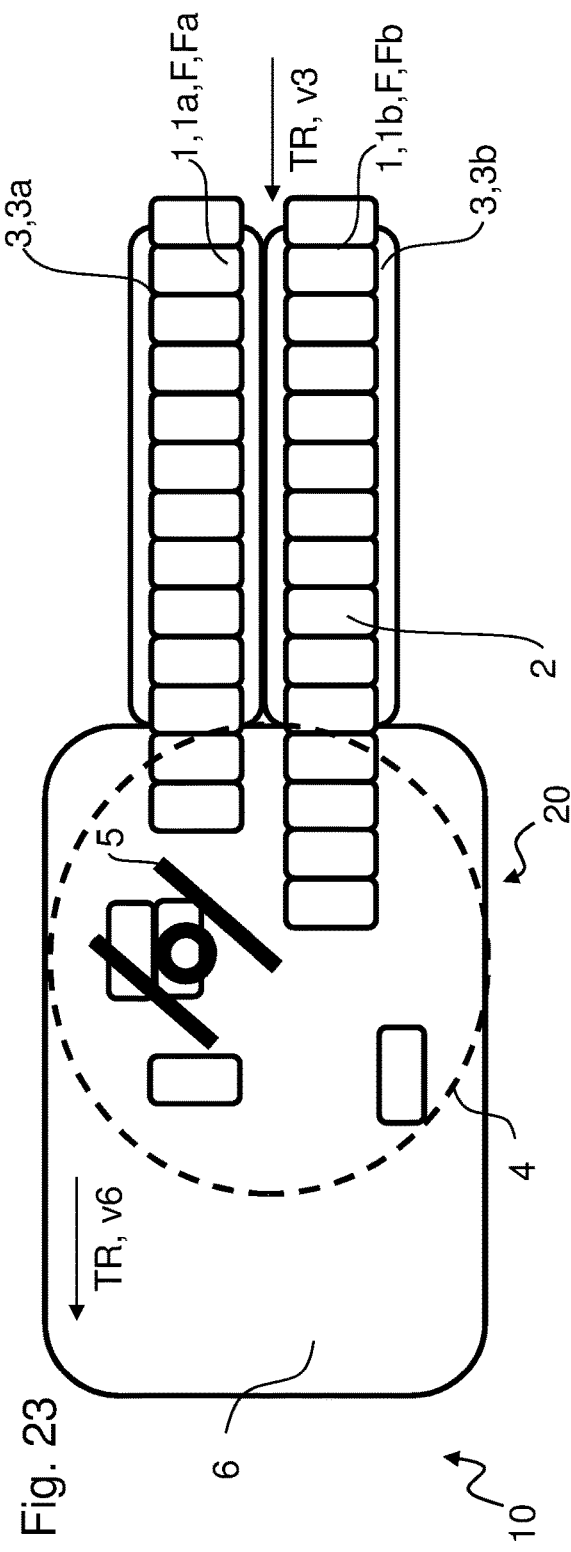

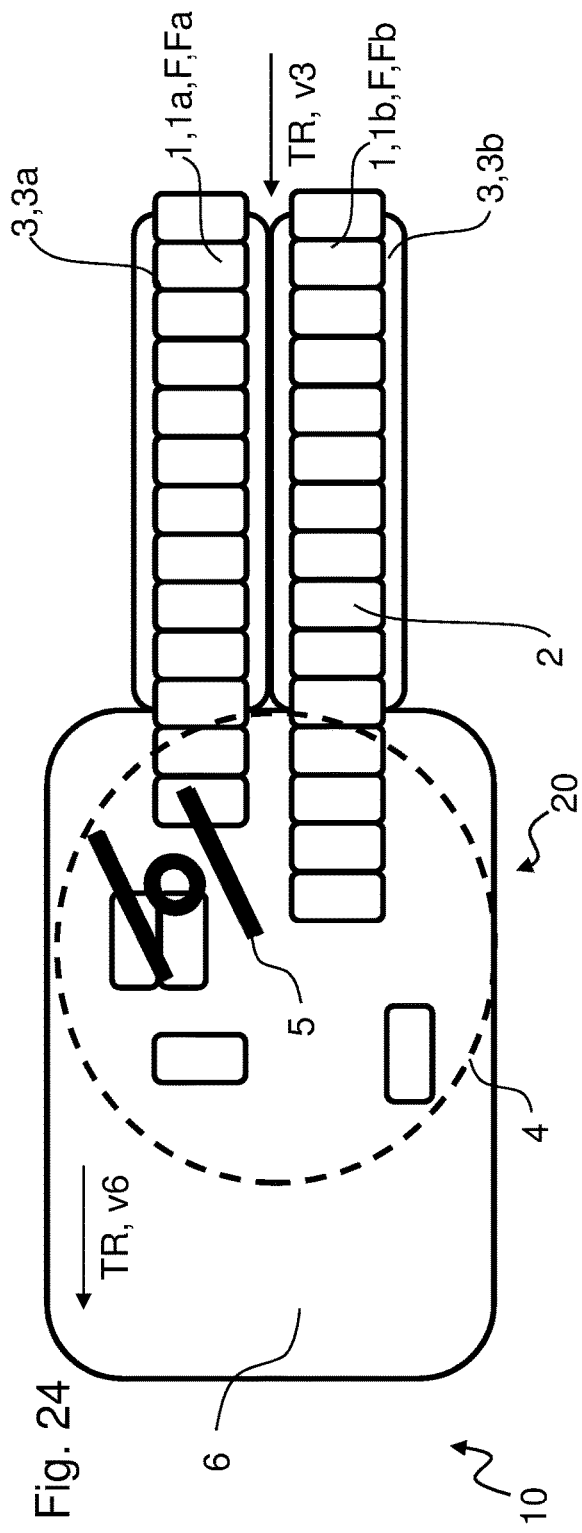
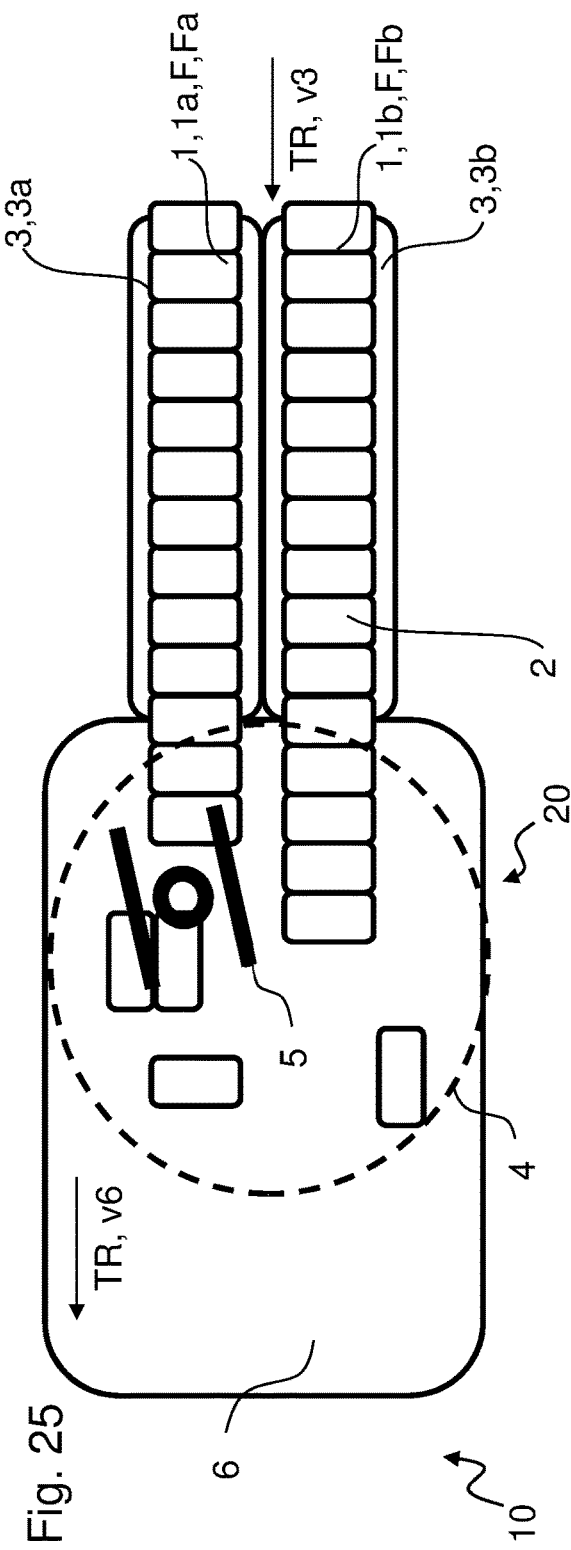

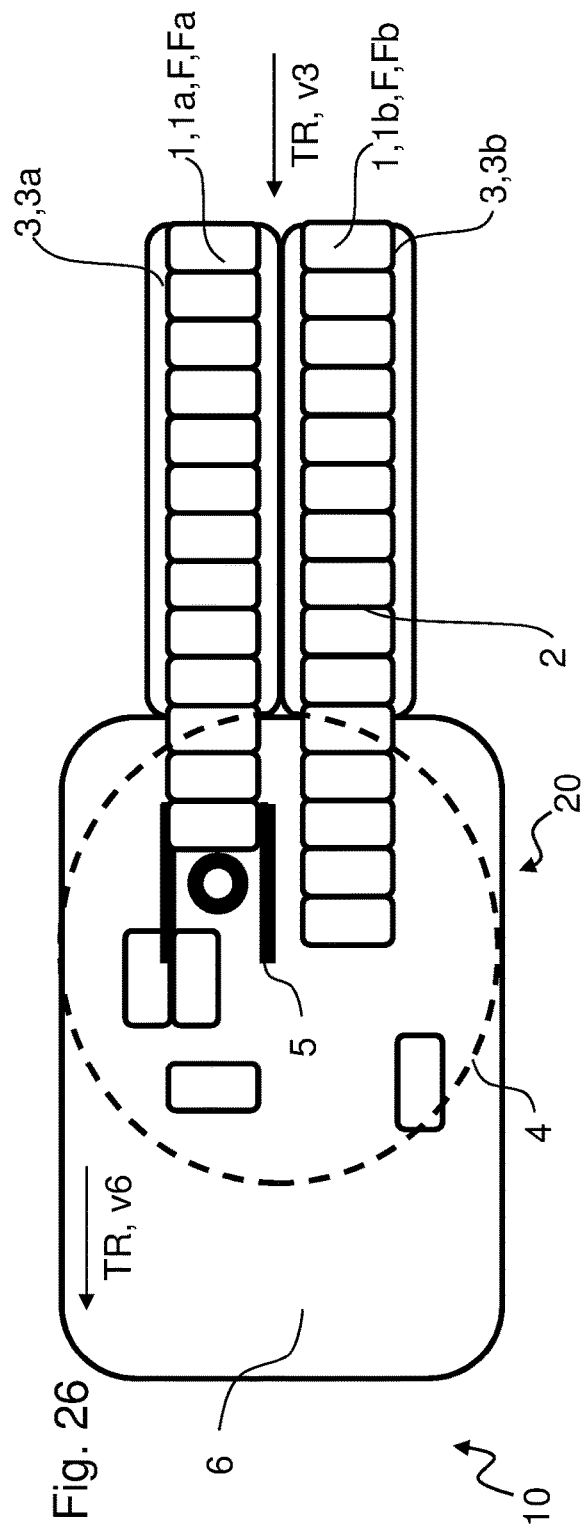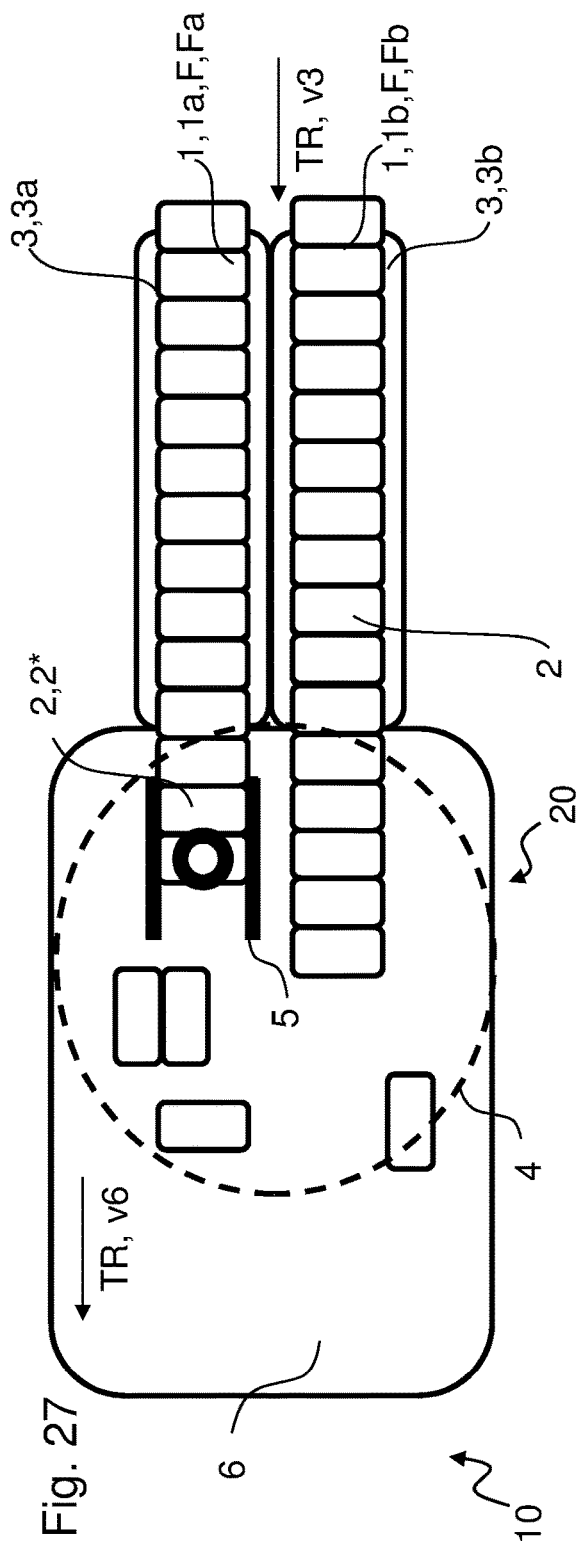

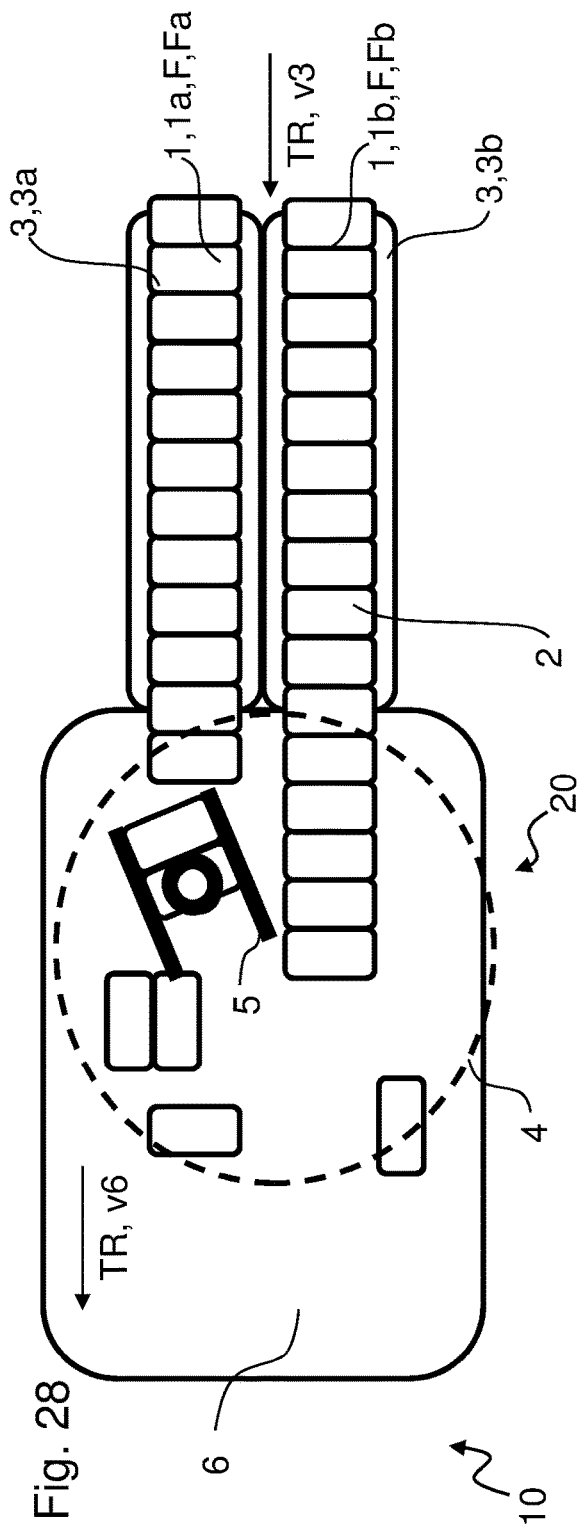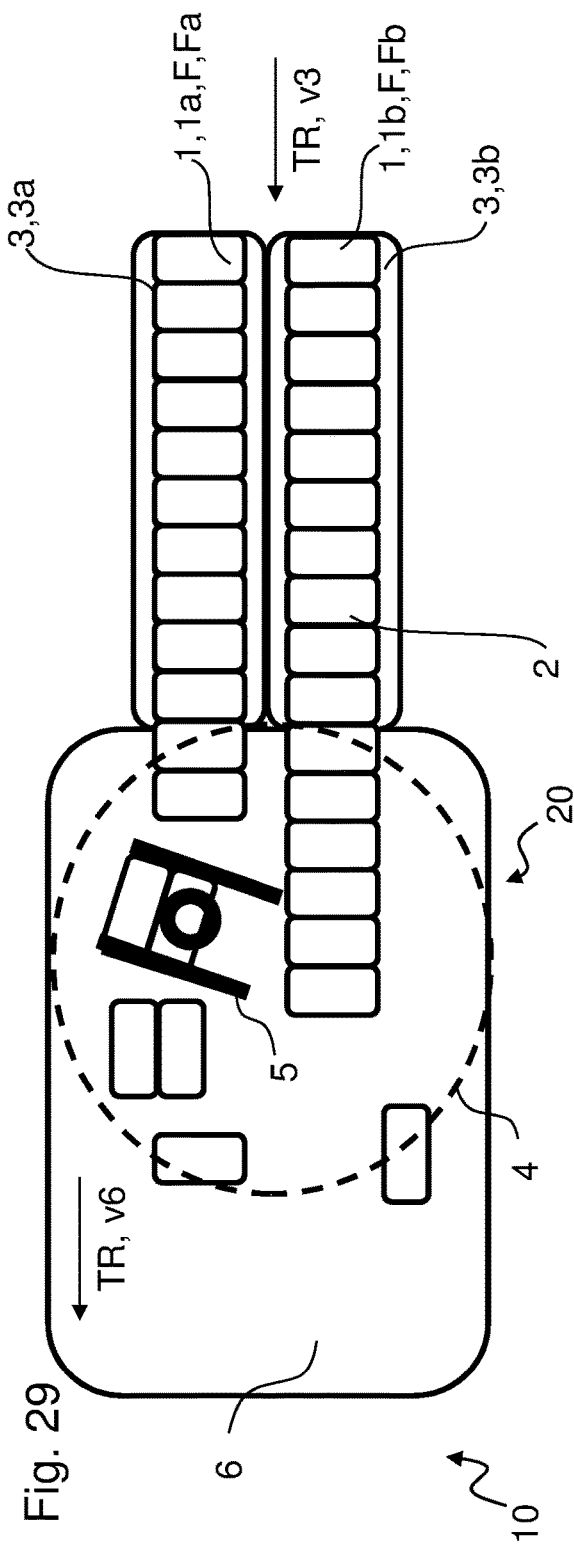

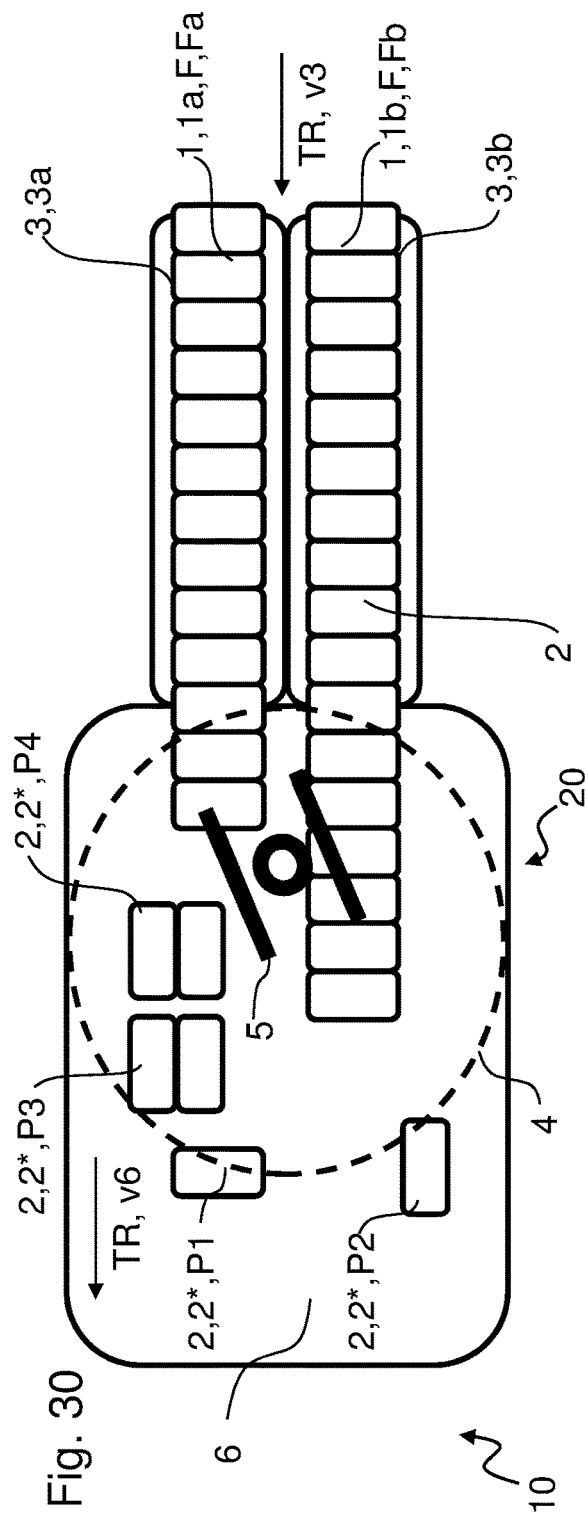
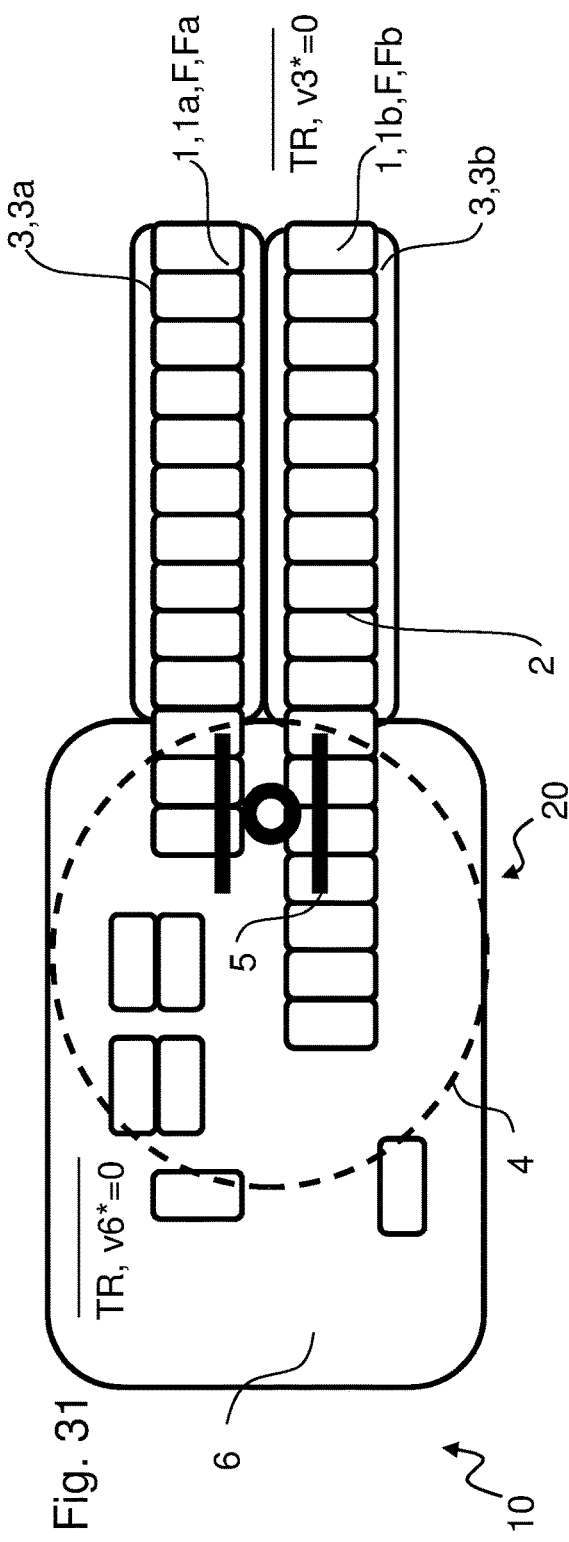

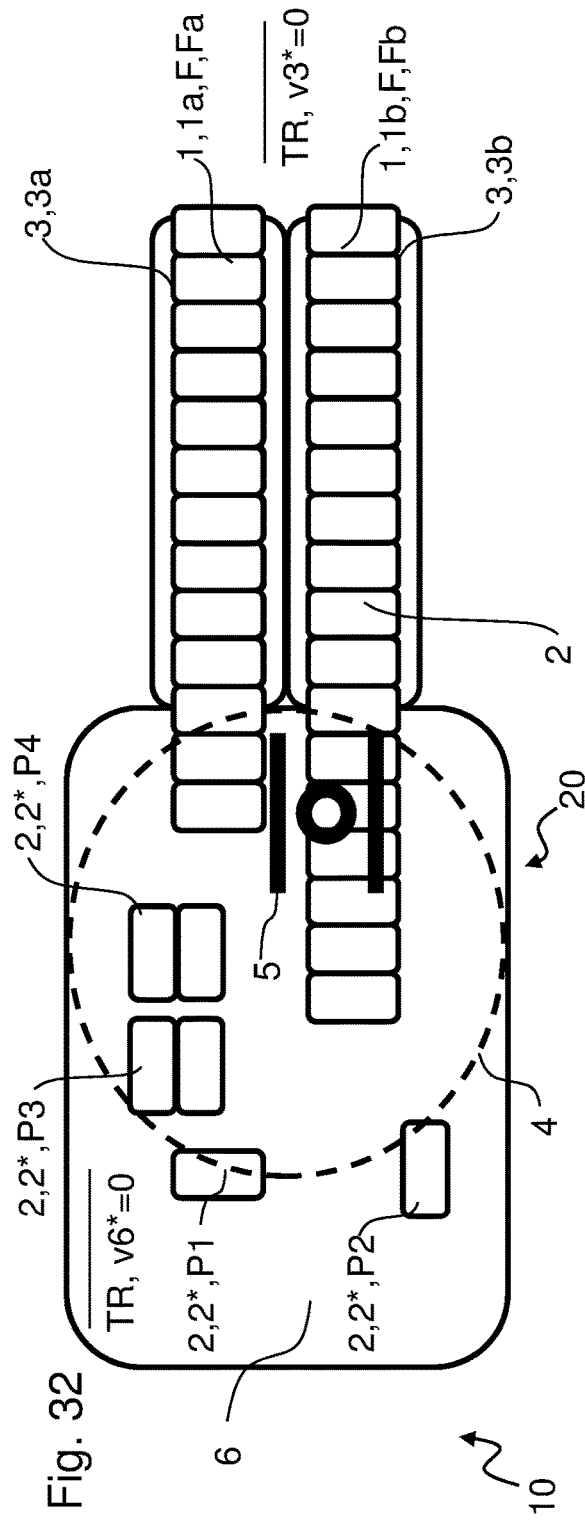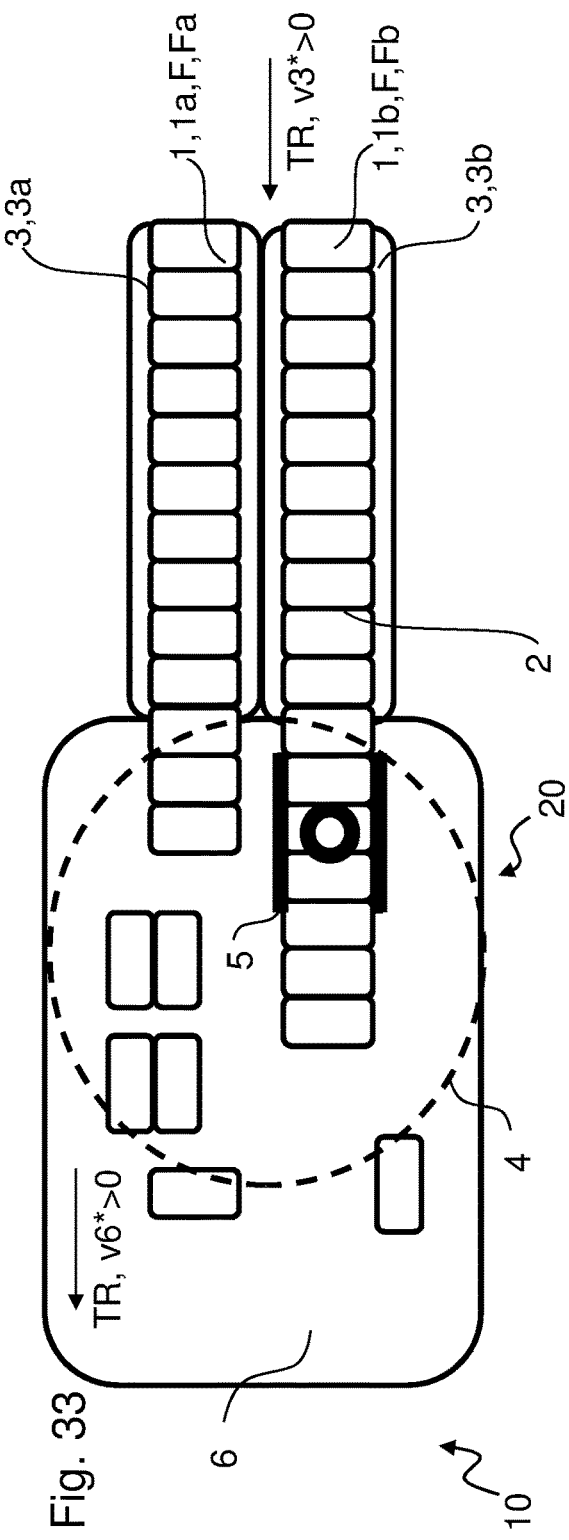

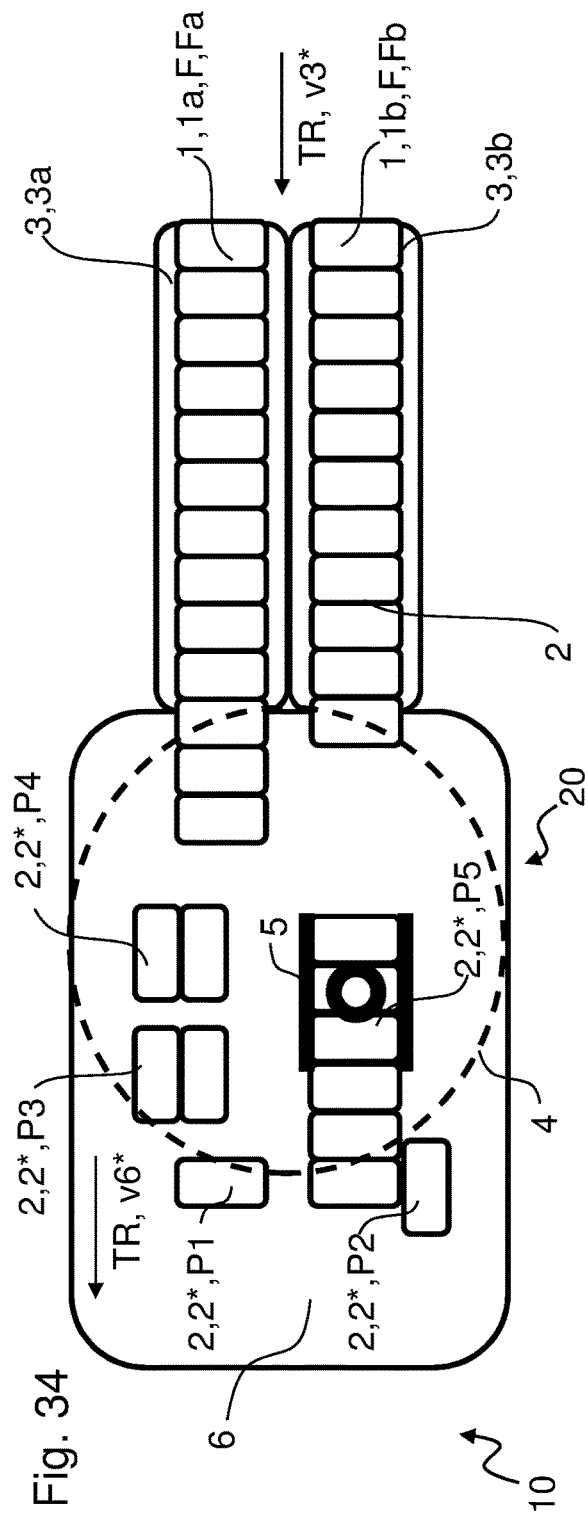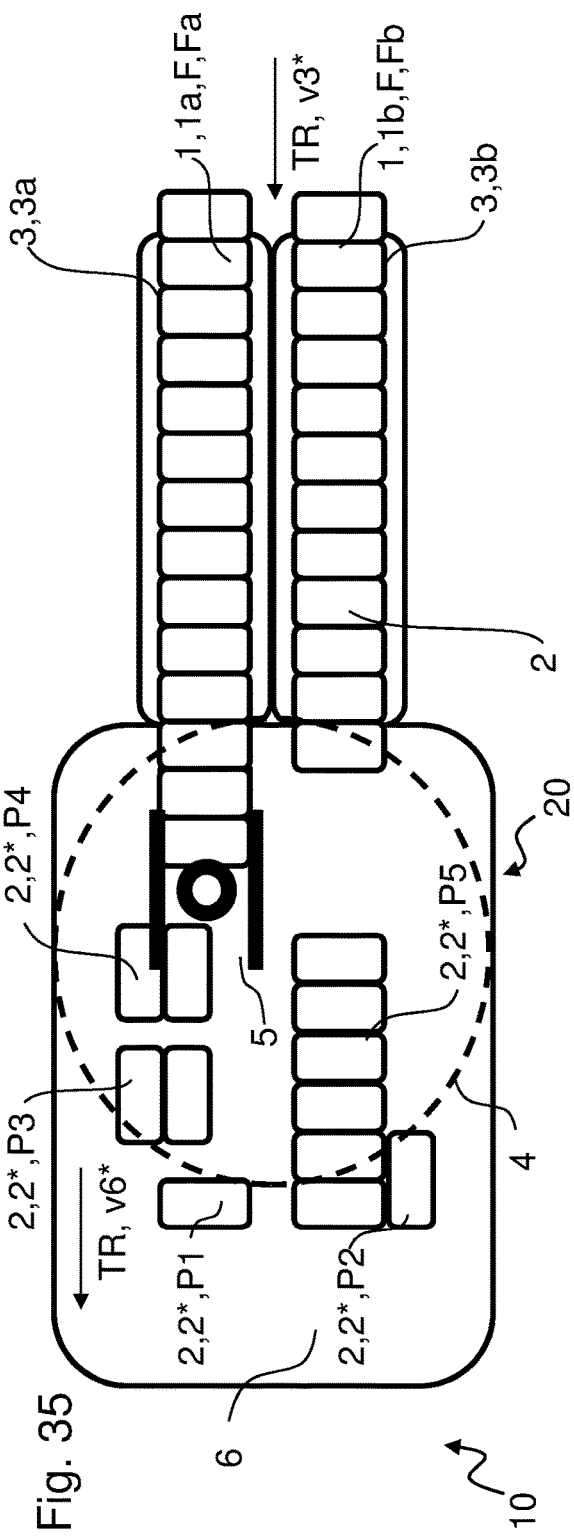

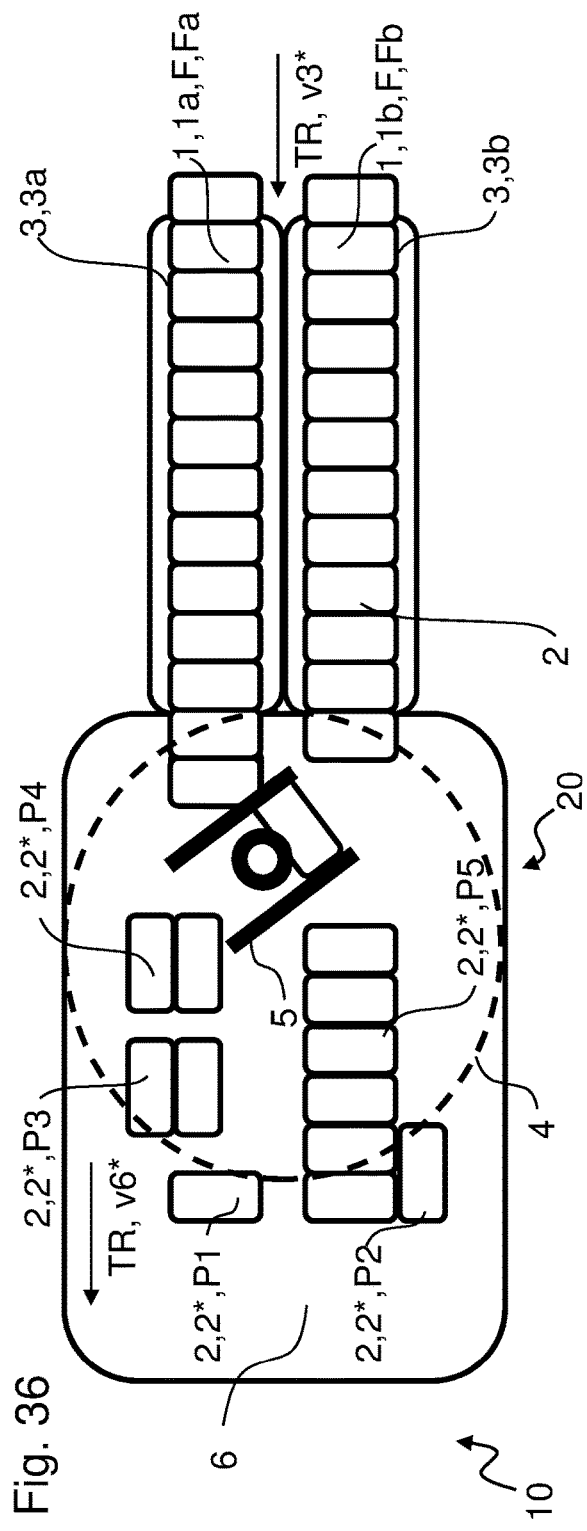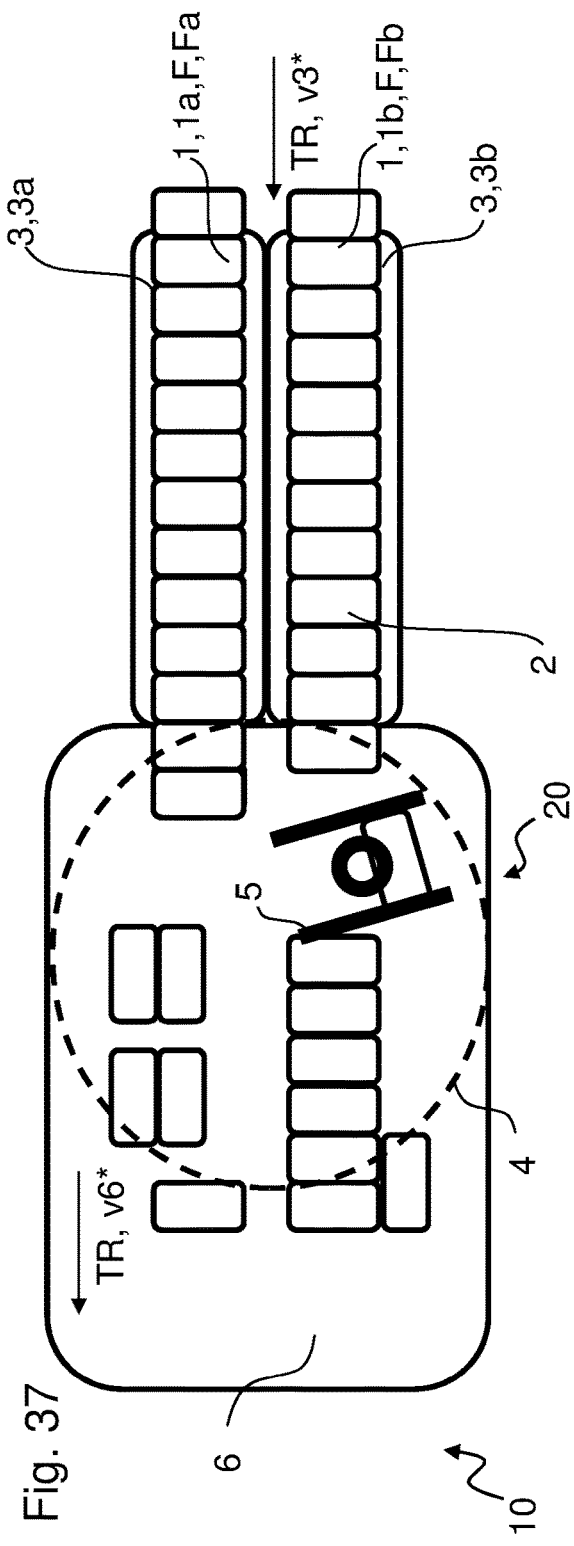

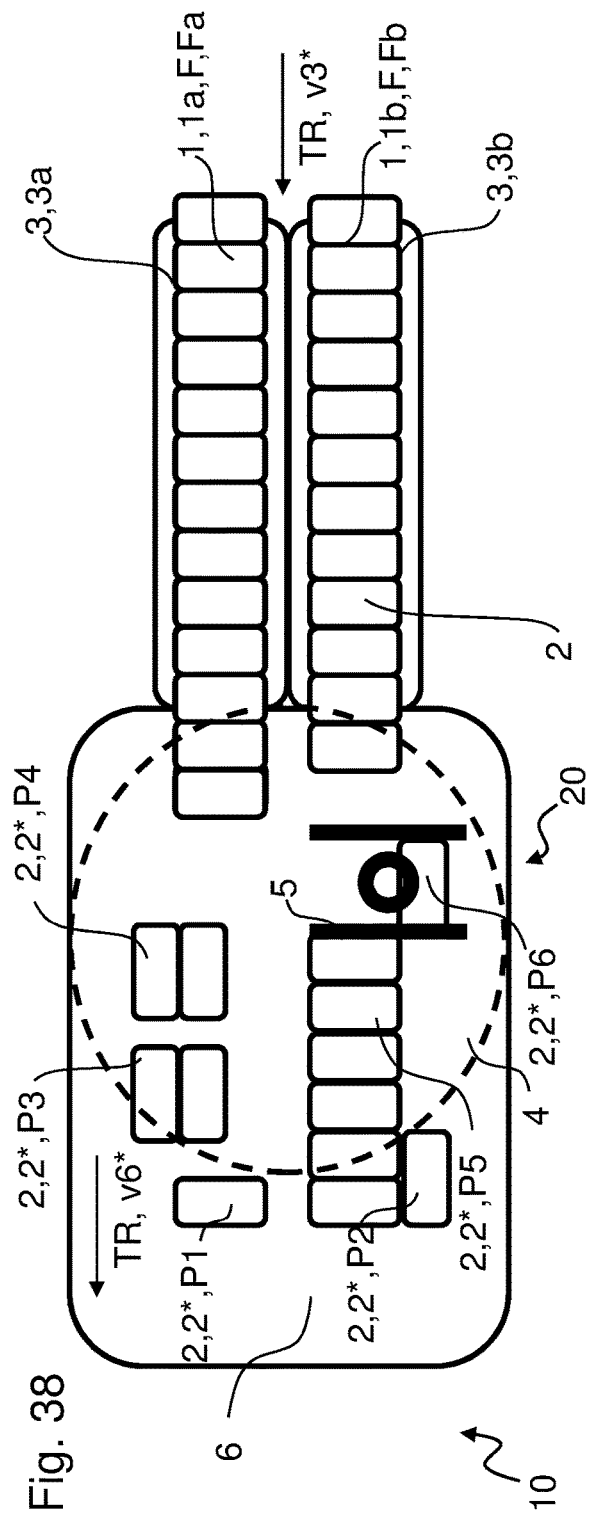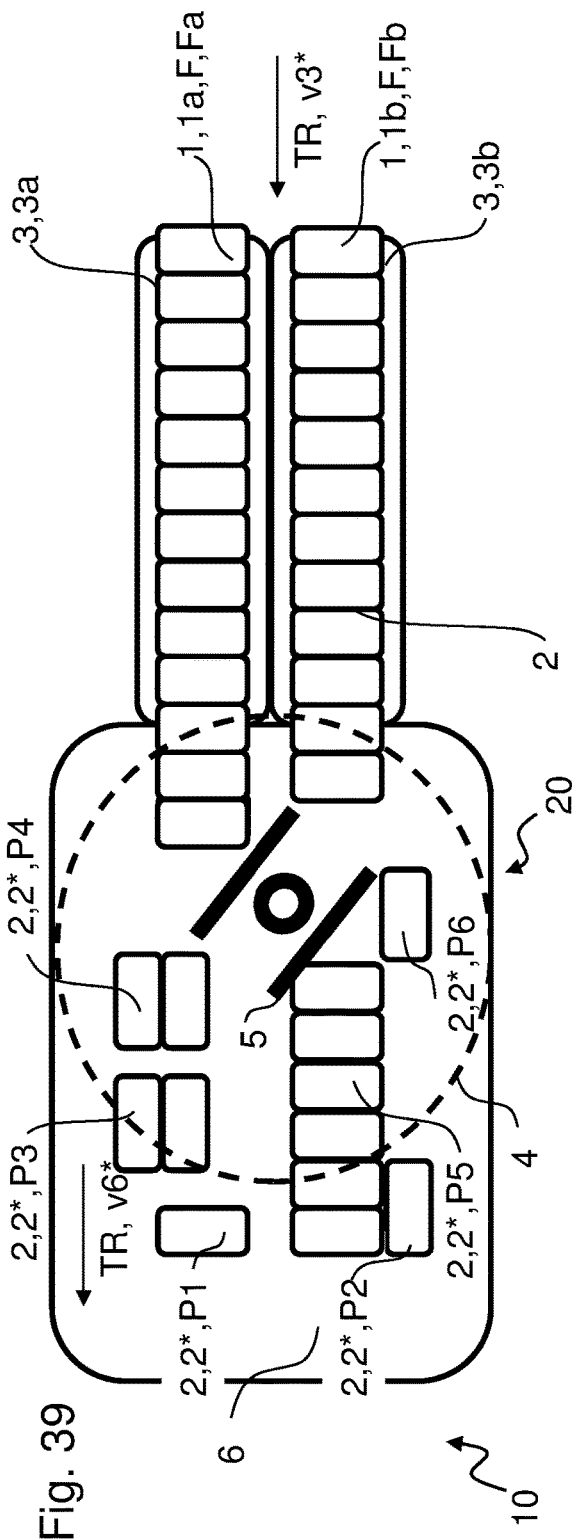

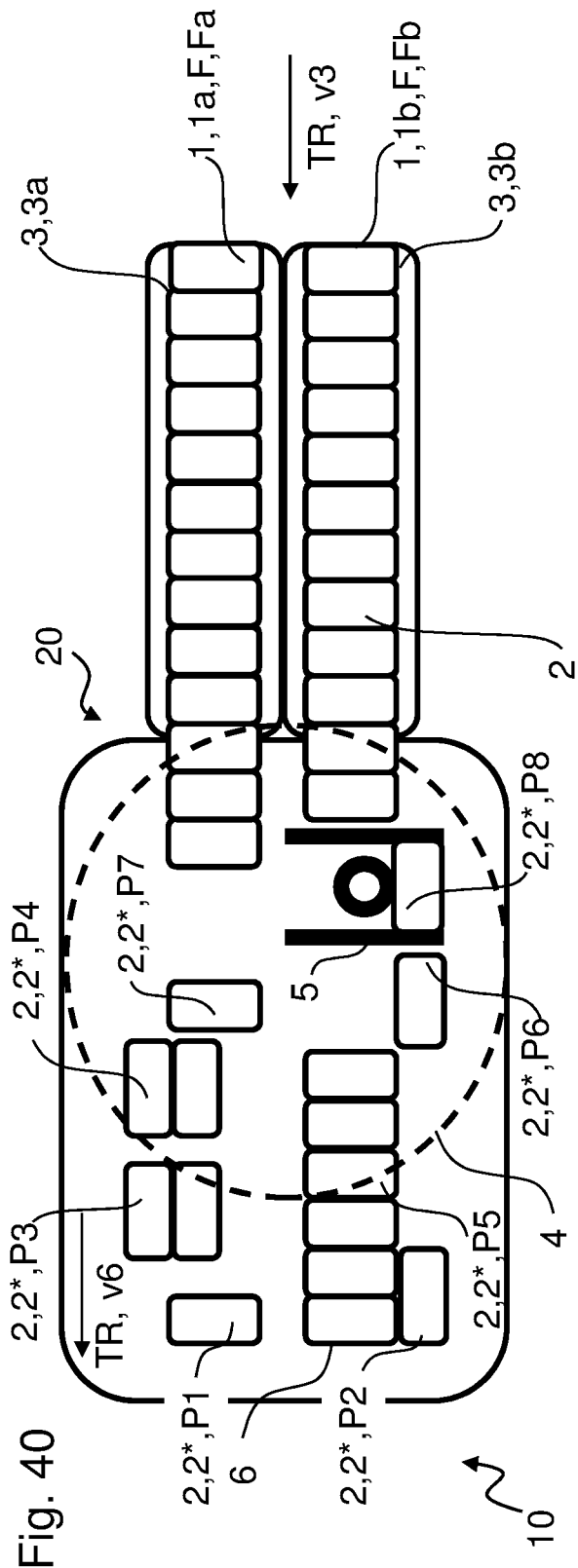

HANDLING SYSTEM AND METHOD FOR HANDLING PIECE GOODS

CLAIM OF PRIORITY

The present application claims priority to International Application PCT/EP2017/053886, filed Feb. 21, 2017, which in turn claims priority to German Application DE 10 2016 125 361.8, filed Dec. 22, 2016, which are incorporated by reference.

FIELD OF THE INVENTION

The present invention relates to a handling system and to a method for manipulating and/or handling piece goods, the handling system and the method having the features of the independent claims.

BACKGROUND OF THE INVENTION

In the known methods for packaging and/or palletizing piece goods, such as packages, bundles, or the like, these are first conveyed on transport devices conveying in lines, and are shifted, aligned, and/or assembled in a suitable manner for producing desired layer patterns that can be subsequently stacked in multiple layers on top of each other, for example on supports prepared for this purpose, such as pallets. These treatment steps can be particularly useful in facilities for treating beverage containers. The piece goods in question can be, for example, packages, crates, boxes, bundles, clusters, or the like articles, optionally with beverage containers gathered together in such a manner. For the mentioned pallets to be safe to transport, the assembled layer patterns, which are also referred to as assembled cycles, have to meet certain requirements. In order to form such cycles, it is customarily necessary to perform preparatory procedures, which consist, for instance, in first conveying piece goods regularly or stepwise on a so-called dosing belt, in then grouping or gathering them on an intermediate transport belt, and in delivering them together and/or in groups from there to a layer-forming belt or to a layer-forming table.

In the prior art it is known to deliver spaced-apart piece goods from a dosing belt onto a transport belt, which means that in each instance individual piece goods are delivered to the transport belt. This delivery can be carried out by each individual piece good being individually delivered onto the transport belt by a speed difference between dosing belt and transport belt; a control by optical sensors, for example by light barriers, can additionally be in place. It is likewise conceivable to deliver the piece goods separately, in a spaced-apart manner from the transport belt by operating the layer-forming belt in a stepwise manner. In order to deliver in each instance individual piece goods from the transport belt onto the layer-forming belt in such a manner, the layer-forming belt can be operated in steps that are synchronized with the transport belt by exactly one length of a piece good in transport direction. These cycles or groups or parts of grouped piece goods, as applicable, can also be rotated on the transport belt according to the desired layer pattern in order to then be delivered to the layer-forming belt.

Prior art knows different embodiment variants for designing grouping tables that serve for bringing together piece goods, such as boxes, shrink packs, trays, and plastic crates. Piece goods can be brought together by being assembled into a two-dimensional formation (block construction, e.g. pallet layer), for example. For this purpose, a roller conveyor, for example, can be supplied linearly from one or several lanes. According to requirements, the piece goods can be rotated prior to or on the roller conveyor, and they can be arranged in the required positions mechanically by stop points. The piece goods positioned in such a way can then be pushed off from the roller conveyor in a direction orthogonal to the transport direction. The supplying, arranging, and pushing off the piece goods can in this context be regarded as a cycle. At least one cycle is needed to assemble one layer, normally however, a plurality of cycles are needed. The partly discontinuous conveyance with its relatively abrupt speed changes or direction changes causes accordingly high mechanical stress on the piece goods, which is potentially detrimental to product-protective processing of the piece goods.

Document EP 1 456 101 A2 discloses an apparatus for forming rows from packaging goods for bundle palletizers. The bundle palletizer comprises at least one layer station and at least one palletizing station. The row forming apparatus comprises at least one positioning station, on which the packaging goods are arranged at desired spaces in at least one row during the transport. The positioning station connects to a staging conveyor assigned to the layer station. At least one accumulating conveyor is disposed upstream from the positioning station, which has several conveyor sections arranged consecutively in transport direction with controllable and regulatable drives. The controllable and regulatable drives make it possible to achieve the desired spacing for the packaging goods. The row forming apparatus has at least one monitoring device for identifying and monitoring the spacing of the packaging goods. The construction of this known row forming apparatus is rather elaborate and complicated, especially since many conveyor belts are required for forming the spaces and/or for rotating the packaging goods.

An apparatus is known from U.S. Pat. No. 5,123,231 A for assembling articles into groups and subsequently packaging them. On a feeder belt and in each instance with a predefined space, the articles are fed to a collection belt where the groups are assembled from an unvarying number of articles. The groups are then fed to a subsequent belt of a packaging device.

EP 1 927 559 A1 discloses a grouping table for bringing together bundles, in particular shrink packs, for the purpose of forming layers, the grouping table comprising a continuously drivable conveyor, disposed downstream therefrom a cyclically drivable step conveyor, disposed laterally next thereto a layer-forming station, and a push-off device associated with the step conveyor and acting orthogonal to the conveying direction for the groupwise transfer of the bundles onto the layer-forming station.

US 2005/0246056 A1 discloses a system for arranging packaging items into a layer that is deposited or stacked on a pallet in following handling procedures. The system involves three linearly disposed conveyor belts. Via a first conveyor belt, the packaging items are supplied to the apparatus. The packaging items are disposed linearly on the first conveyor belt. With the second conveyor belt, the packaging items are spaced apart. Subsequently, the packaging items reach a third conveyor belt, where the arrangement of the packaging items is carried out. All three conveyor belts run at different, however, in each instance constant speeds. When a layer is completely assembled, it is transferred onto the pallet.

Furthermore, a method for forming palletizable layers from piece goods standing next to each other on a layer-forming station is known from DE 10 2011 080 812 A1.

Associated with the layer-forming station is a program-controlled manipulator for collecting and/or transferring individual or several piece goods from at least two feed stations that are spatially apart or offset from one another and for positioning the piece goods by rotating and/or shifting them into specifiable release positions on the layer-forming station.

Manipulators of this type or also robots assigned to the layer-forming belts can be designed as multi-axis robots, for example, such as are known from DE 10 2009 026 220 A1, for instance, in the context of grouping articles or beverage containers. A frequently used variant of suchlike manipulators are so-called gantry robots, which are often employed in a modular structure in packaging lines, in grouping units, or in palletizing stations. A conveyor belt extending horizontally in longitudinal direction of the conveying level, or another kind of endlessly circulating means, are types of frequently used transport means or conveying units on which the objects and/or packages are disposed in predetermined or also in randomly assumed positions. Such a module is known, for example, from DE 10 2009 043 970 A1. The gantry robots that are typically employed in such modules as are known from DE 10 2010 020 847 A1, for instance, can be equipped with gripping apparatuses, for example, for lateral seizing of the piece goods to be handled or manipulated.

All of the known handling systems, grouping systems, or palletizing systems, however, are hardly able to handle failure events, such as outages of drive modules or handling modules, caused, for instance, by temporary interruptions of the electric power supply. After a voltage drop or an interruption of the power supply in the known systems, it is thus not possible to continue the production operation without manual intervention. For this purpose, it is at least necessary to manually empty the grouping system, to reset the machine into a basic initial position, and to then restart production operation. In this context, it is indispensable for a restart of the production operation to always start from a specified initial situation, specifically from the beginning of a new layer. A manual intervention entails high costs in terms of staff and time.

A primary object of the invention is to remedy these disadvantages and to provide a method for handling piece goods as well as a corresponding handling system that can handle suchlike failure events and that, in particular, enables to dispense with a manual intervention after the removal of failures in the production flow.

This object of the invention is achieved by the subject matter of the independent claims, that is to say, by a method and an apparatus for handling piece goods moved one after another in at least one row, the method and the apparatus comprising the features of the independent claims. Features of advantageous further developments of the invention are indicated in the relevant dependent claims.

SUMMARY OF THE INVENTION

In order to achieve the stated object, the invention is a method for manipulating piece goods or bundles and/or for handling and/or positioning piece goods or, as applicable, changing the position thereof, with the piece goods or bundles being moved one after another in at least one row in a conveying direction or transport direction, as applicable, on a horizontal conveying device. The method provides that in each work cycle in each instance at least one transported piece good or bundle is seized by at least one handling device from the at least one row in a clamping and/or force-locking and/or form-locking manner, is spatially separated from the row, and is brought into a specified relative target position and/or target alignment relative to subsequent piece goods or bundles, for example in order to form a palletizable layer from a specified number of suchlike repositioned and/or realigned piece goods, where a plurality of such layers can be stacked on top of each other in subsequent method steps and can be deposited on a pallet supplied for this purpose, for example. After handling and repositioning and/or realigning performed in such a way, the at least one separated and moved piece good or bundle is further transported in the same conveying direction or, as applicable, in the same transport direction as before, in particular, on a support surface moving evenly in conveying direction or, as applicable, in transport direction, which support surface can be formed, for example, by a horizontal conveying device with an endlessly circulating link belt or an endlessly circulating conveyor mat or the like, as are typically used for this purpose.

According to the invention, after a failure event with an at least temporary standstill of the horizontal conveying device and/or of the handling device has occurred and has been removed, the handling device is first reinitialized. Such a failure event can be, in particular, a temporary outage of the electric power supply of the entire handling facility and/or of the packaging facility or also of parts of this facility. As soon as the failure has been remedied, that is to say, for example, the electric power supply has been restored and the handling device has been reinitialized, the horizontal conveying device can restart in a self-acting manner nearly at the same time or after an expedient delay phase, such that the previously interrupted handling process and/or position changing process can be continued in a largely unchanged manner.

The method according to the invention has the particular advantage over the known methods and facilities that no manual interventions are required in connection with the restart of the packaging facility and/or handling facility for the piece goods to be positioned or, as applicable, to be brought into a stackable arrangement, but rather that, after failures have been removed, a self-acting start of a further handling and positioning of the piece goods can be carried out that seamlessly ties up to a previously interrupted handling situation. Whereas in currently known grouping systems a continuation of the production operation after a voltage drop or a temporary outage of the electric power supply is not possible without manual interventions, the method according to the invention provides such a possibility of the continued operation of the positioning procedure and/or grouping procedure for piece goods. Manual emptying and resetting of the machine into an initial state with grouping of a new layer having to be started can be omitted in this way. By contrast, it was hitherto impossible to start the production operation or, as applicable, resume the production operation within an already commenced processing cycle. The method according to the invention renders manual intervention into the processes of handling, manipulating, and/or grouping of the piece goods unnecessary; and such manual intervention is particularly disadvantageous because it involves personnel input and a relatively long standstill even after the actual failure has already been remedied. In addition, the articles, piece goods, or bundles that are manually removed from the processing operation have to be returned into the production, thus requiring additional effort.

The method according to the invention makes it possible that, after the failure has been remedied and/or after the failure event has been ended and/or removed, the horizontal conveying device restarts in a self-acting manner and automatically, and, in addition, that, after the initialization has been performed, the handling device continues the previously interrupted handling process and/or positioning process for the piece goods at the point of interruption. The method can thus be regarded as a self-healing process or, in other words, as a process that runs fully automatically and that renders unnecessary all manual interventions after the failure has been remedied, because the method provides a restart of the horizontal conveying device as well as the continuation of the handling process and positioning process of the handling device without manual interventions, in particular, without manual interventions in connection with the removal of piece goods.

The occurrence of a failure event does involve a system interruption, but after the failure event has been removed, for example after a power outage and a subsequent restoring of the power supply, an automatic continuation of the previously interrupted handling flow and/or positioning flow for the piece goods on the horizontal conveying device is carried out. The trouble-free restart of the production process can be particularly ensured thereby that all positions of the piece goods located on the horizontal conveying device and/or located in a seizing range of the handling device are in each instance intermediately stored, such that, after the failure has been remedied, that is to say, after the system interruption, these positions can also be used and retrieved for the continuation of the process flows and for the control of the movement patterns of the handling device.

Another variant of the method according to the invention provides that, after the failure has been remedied or, as applicable, after a system interruption, the movement control of the handling device and/or of the horizontal conveying device is operated in a mode for restarting and/or for repairing, which is also referred to as clearing mode or restart mode, and which differs from the regular movement control in terms of the control of the handling components. The control can thus provide, for example, that deviating movement controls are worked with within one, two or more cycles, where such a cycle can in particular be a pallet layer of stackable piece goods. In particular, it can thus be provided that the method, after the failure has been remedied, can run for a specified period of time in the repair mode or, as applicable, clearing mode or restart mode that can be interposed as so-called clearing process/clearing mode, with substantially only those components being activated that are currently necessary for establishing a regular production mode. For example, the conveyor belt can thus first remain stopped in this mode and only start slowly, while in this phase the piece goods are being handled and shifted and/or rotated in a slower positioning process.

The method can provide that, after the failure has been remedied or, as applicable, after a system interruption, at least the horizontal conveying device starts at reduced speed (limit case: v=0) and runs for a specified period of time at a feed speed that is reduced relative to the regular production mode. It can also be provided that, with the horizontal conveying device having started at reduced feed speed, the handling device starts at reduced positioning speed and is operated for a specified period of time at a positioning speed that is reduced relative to the regular production mode. In this way, it can be ensured that it is possible to change back into the regular production mode without further failures, which could be caused, for example, by minor deviations from the target positions for the piece goods. This is facilitated by the mentioned slowed-down movement control for various components.

A further advantageous variant of the method according to the invention can provide that, in the repair mode, which can also be regarded or referred to as clearing mode or as restart mode, stored position values of all piece goods, that is to say, absolute values of all positions of the piece goods on the horizontal conveying device, as well as the relevant position values of the movable parts or sections of the handling device, can be retrieved after the handling device has been initialized, thus allowing a continuation of the previously interrupted positioning process of the piece goods that up to the system interruption had not yet been positioned. The availability of these position values of the piece goods, as well as of the movable parts of the handling device allows "thawing" the system after a previous "freeze" caused by the system interruption. Since the handling device is reinitialized prior to the so-called "thawing", that is to say, prior to the continuation of the previously interrupted positioning cycle, each commenced work cycle interrupted by the occurred failure event can be continued and/or completed trouble-free after the initialization of the handling device at reduced speeds of the movable support surface of the horizontal conveying device and/or handling device. This is enabled in particular thereby that, after the failure has been remedied and after the initialization has been performed, the handling device can be returned very precisely to the process flows and/or movement patterns interrupted by the failure event and can thus continue its handling steps in the in each instance particularly interrupted phase by a query of the signal values from absolute encoders assigned to movable sections at least of the handling device. This means that an interrupted gripping process and/or shifting process can in each instance be completed at the point of interruption by disengaging the handling device from the piece goods, by initializing the handling device, as well as by again gripping and shifting the previously gripped piece goods. A suchlike completed gripping and shifting process is then succeeded by the gripping and shifting process that follows next in the layer forming process.

The method can furthermore optionally provide that, in the repair mode or, as applicable, in the clearing mode or restart mode, the positions of all piece goods are detected by a correspondingly equipped image processing, and are brought into relation with the movements of the handling device. Alternatively or additionally, it can moreover be provided that, in the repair mode (clearing mode, restart mode), the positions of all piece goods are detected by at least one sensor, which is movable parallel to the horizontal conveying device, and are brought into relation with the movements of the handling device. This at least one sensor, which can also be referred to as "moving sensor", is movable at least in the x-axis, that is to say, along an axis parallel to the movement direction of the horizontal conveying device on which the piece goods are moved standing upright while they are being positioned and grouped, for example, into a layer arrangement, by the handling device.

If a "handling device" is generalizingly referred to in the context of the present description, this definition comprises a manipulator or a plurality of manipulators as well as movable transport devices interacting with the manipulator or with the manipulators, for example, a horizontal conveying device on which the piece goods are moved within a seizing range of the manipulator, seized by the manipulator and repositioned or grouped, as applicable.

In order to achieve the above-mentioned objects, the invention furthermore proposes a handling system for manipulating and/or handling piece goods and/or changing the position thereof, with the piece goods being moved one after another in at least one row in a conveying direction or, as applicable, in a transport direction, on a horizontal conveying device. This handling system comprises a horizontal conveying device for conveying piece goods one after another in at least one row in a conveying direction or, as applicable, in a transport direction, as well as, spatially assigned to the horizontal conveying device, at least one handling device for seizing in each instance at least one piece good in a clamping and/or force-locking and/or form-locking manner, and for the spatial separation thereof from the row, and for the transfer of the at least one piece good into a specified relative target position and/or target alignment relative to subsequent piece goods. The handling system in addition comprises a control system for monitoring the feed movements of the horizontal conveying device and the seizing movements and positioning movements of the at least one handling device, as well as for the control thereof, in particular, to form palletizable layer arrangements of a plurality of shifted and repositioned and/or realigned piece goods. In the control system, control routines are contained or, as applicable, stored, for the identification of occurring failure events with at least temporary standstills of the horizontal conveying device and/or of the handling device, and for the reinitialization of the handling device, and for the continued seizing movements and positioning movements thereof for handling the piece goods, as well as for the self-acting restart of the horizontal conveying device after the failure has been remedied and the failure event has been ended. These control routines contained or, as applicable, stored in the control system enable a self-acting and automatic restart of the horizontal conveying device after remedy of the failure and/or removal thereof and they provide a suchlike self-acting and automatic restart of the horizontal conveying device after remedy of the failure and/or removal thereof.

After the reinitialization of the handling device, the control routines contained or, as applicable, stored in the control system in the handling system according to the invention can provide for a self-acting and automatic continuation of the previously interrupted handling process and/or positioning process for the piece goods at the point of interruption, thus enabling a self-healing process, so to speak, or, in other words, a fully automatic restart of the horizontal conveying device, as well as a corresponding fully automatic continuation of the handling process and positioning process of the handling device, thereby rendering obsolete all manual interventions that are indispensable in customary facilities after an outage of the electric power supply or another disruption of the process that leads to a standstill of the facility.

The handling system according to the invention, in which the occurring failure event entails a system interruption, and in which an automatic continuation of the previously interrupted handling flow and/or positioning flow for the piece goods on the horizontal conveying device is provided after removal of the failure event, can thus react to power outages or to other system interruptions without manual interventions, and particularly without any manual interventions, for example, for clearing the facility areas where there are piece goods that are still disordered and no longer clearly identifiable in their positions or, as applicable, no longer integrable into the grouping process or layer forming process, as applicable.

In a variant of the handling system according to the invention, a sensor system can optionally be present for the detection and intermediate storage of all positions of the piece goods located on the horizontal conveying device and/or located in a seizing range of the handling device, as well as for the transmission thereof to the control system, wherein, after the system interruption, in each instance intermediately stored positions of the piece goods are retrievable for the continuation of the process flows and for the control of the movement patterns of the handling device. In this way, all interrupted processes can be continued seamlessly without having to first remove, for example, incomplete layer patterns from the horizontal conveying device in order to again group a complete layer of piece goods.

In an advantageous variant of the handling system, sensors and/or absolute encoders can be assigned to at least some movable sections of the handling device, the data from which sensors and/or absolute encoders are processed for a reinitialization after a system interruption and for the continuation of an interrupted and not yet completed handling process for at least one piece good to be positioned. In addition, the control system of the handling system can comprise further control routines for a restart mode and/or repair mode (clearing process/clearing mode) that deviates from the regular movement control. These modes deviate to a greater or lesser extent from the regular movement control or, in other words, movement curve, and these deviating control routines are stored in the software of the control system. In this way, additional movement curves can be retrieved that deviate from a regular CNC production curve so that at first substantially only those components are activated that are necessary for establishing a production mode. These control routines can, for example, first provide a standstill of the conveyor belt in the module, while the handling device carries out position changes for the piece goods. If the absolute values of all positions are known and are retrieved, a seamless continuation of the previously interrupted positioning process is possible.

The handling system can optionally be designed in such a manner that the control system processes sensor signals from an image-processing module for the detection of the positions of all piece goods, and relates them to the movements of the handling device.

In some or all described variants of the handling system, as well as in some or all previously described method variants, the at least one handling device can be formed by, for example, a parallel kinematic robot with at least one controllable gripping arm for seizing a piece good or a plurality of piece goods simultaneously, the movement range thereof being spatially assigned to the horizontal conveying device. It is however also conceivable that the at least one handling device is formed by a gantry robot with at least one controllable gripping arm for seizing a piece good or a plurality of piece goods simultaneously, the movement range thereof being spatially assigned to the horizontal conveying device. Moreover, the at least one handling device could also be formed by a multi-axis robot with at least one controllable gripping arm for seizing a piece good or a plurality of piece goods simultaneously, the movement range thereof being spatially assigned to the horizontal conveying device.

It should be explicitly mentioned at this point that all aspects and embodiment variants explained in the context of the handling system according to the invention can likewise pertain to or constitute partial aspects of the method according to the invention. If specific aspects and/or interrelations and/or effects relating to the handling system according to the invention are referred to at some point in the present description or in the claims definitions, this therefore likewise pertains to the method according to the invention for manipulating and/or handling piece goods. The same applies conversely, so that all aspects and embodiment variants explained in the context of the method according to the invention can likewise pertain to or constitute partial aspects of the handling system according to the invention. If specific aspects and/or interrelations and/or effects relating to the method according to the invention are referred to at some point in the present description or in the claims definitions, this therefore likewise pertains to the handling system according to the invention.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged relative to other elements to facilitate an understanding of the invention.

FIG. 1 shows a schematic flow chart of an exemplary sequence of method steps of an embodiment variant of a method according to the invention for manipulating and/or handling piece goods and/or for changing the position thereof.

FIGS. 3 to 40 schematically show a temporal sequence of a method according to the invention for handling piece goods moved one after another in two parallel rows by a handling device for preparing and grouping a layer of piece goods according to FIG. 2.

Figure 2:
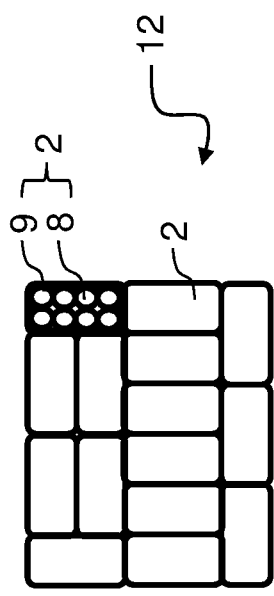
FIG. 2 shows a schematic top view of an exemplary assembly of a plurality of piece goods in a layer, which can serve for palletizing and further processing, for example.
Figure 3:
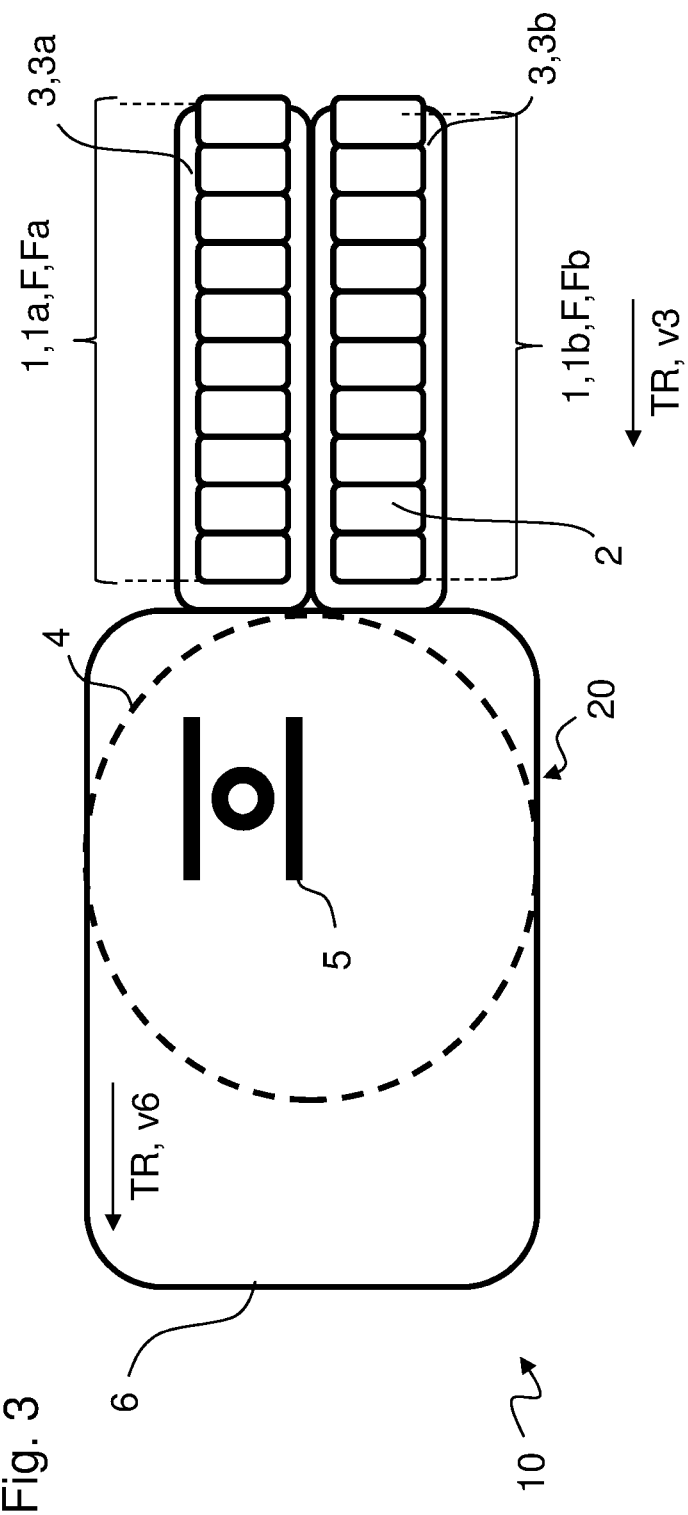
Figure 4:
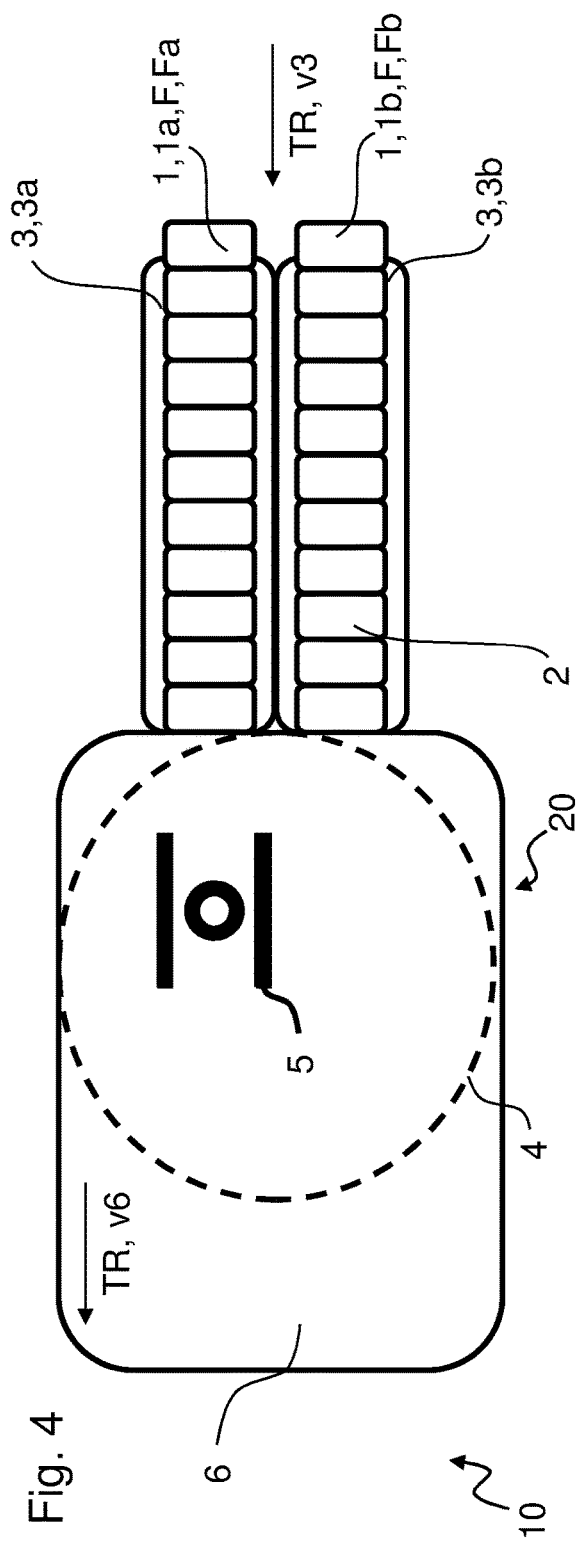
Figure 5:
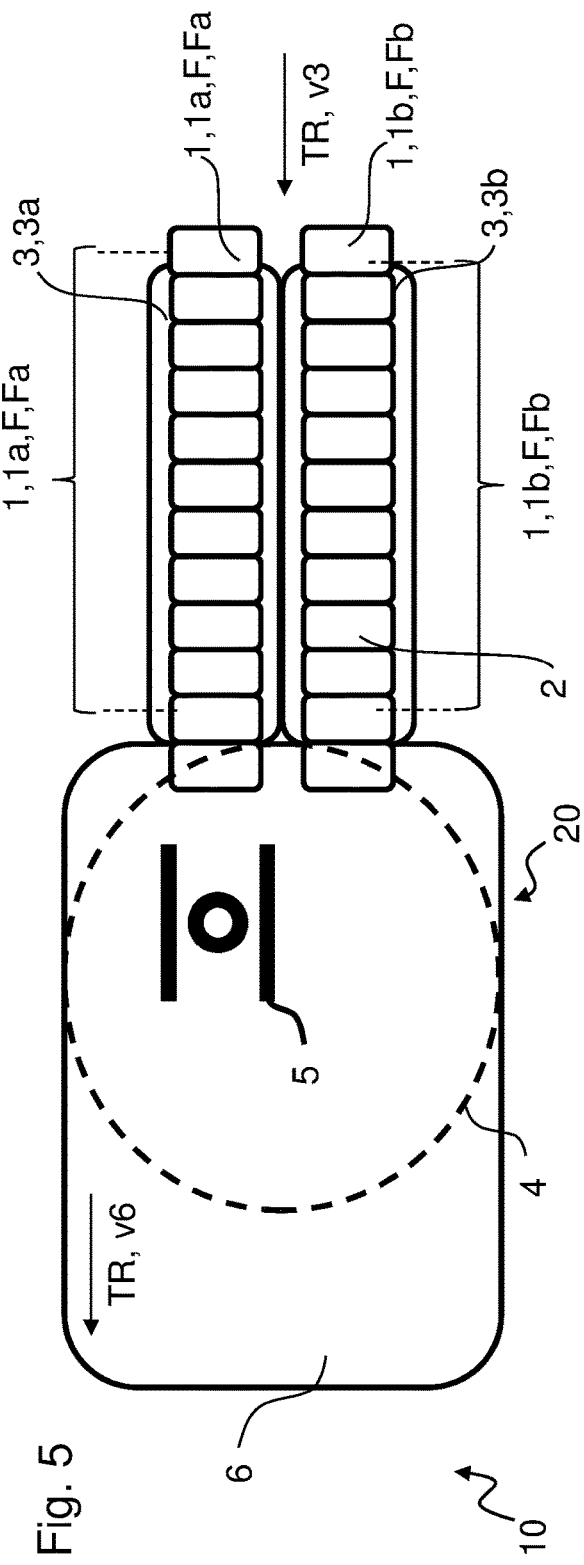

The same or equivalent elements of the invention are each designated by the same reference characters in the FIGS. 1 to 41. Furthermore, and for the sake of clarity, only the reference characters relevant for describing the individual figures are provided. It should be understood that the detailed description and specific examples of the method and the handling system according to the invention, while indicating preferred embodiments, are intended for purposes of illustration only and are not intended to limit the scope of the invention. It should be noted at this point that the exemplary embodiments described relatively concretely and objectively by the figures are in no respect intended to diminish or restrict the abstract inventive idea as laid down in the claims and specified in the general part of the description in diverse embodiment variants.

DETAILED DESCRIPTION OF THE INVENTION

On the basis of an exemplary sequence of method steps, the schematic flow chart of FIG. 1 illustrates a possible embodiment variant of a method according to the invention for manipulating and/or handling piece goods and/or changing the position thereof, with the piece goods being moved one after another in at least one row in a conveying direction or transport direction, as applicable, on a horizontal conveying device (method step S1), with the aim of bringing the piece goods, for example, into a layer arrangement relative to each other, the arrangement being stackable and/or palletizable, where a plurality of piece goods are closely pushed together within a specified, preferably rectangular area such that a stackable and/or palletizable arrangement of the piece goods results. In the following method step S2, the method provides that in each work cycle in each instance at least one transported piece good, typically however, a plurality of piece goods is or are simultaneously seized by at least one handling device from the at least one row in a clamping and/or force-locking and/or form-locking manner, is or are, as applicable, spatially separated from the row and—in the subsequent method step S3—is or are, as applicable, brought into a specified relative target position and/or target alignment relative to subsequent piece goods, whereupon the at least one separated and moved piece good is or, as applicable, the plurality of piece goods are further transported in the same conveying direction or, as applicable, transport direction as before.

The method provides a continuation of the handling operation after a temporary failure event, which can be caused, for example, by an outage of an electric power supply, and which leads to a temporary standstill both of the conveyance of the piece goods and of the drive units of the handling device, such that the grouping operation can be at least interrupted, in unfavorable conditions even severely disrupted. In order to eliminate these failures, the method according to the invention provides in a method step S4 that, after a failure event with an at least temporary standstill of the horizontal conveying device and/or of the handling device has occurred, the handling device is first reinitialized in a method step S6, in which connection moreover all positions hitherto reached and all alignments of all piece goods located within the seizing range of the handling device have been detected and intermediately stored in a method step S5, and are made available to a control for a continuation of the interrupted process. In the method step 6, it can be particularly expedient for the initialization of the handling device to move the handling device into a starting position, for example by moving a gripping arm of a parallel kinematic robot or of a gantry robot into a neutral position or into a position at the edge, such that a recalibration of the precise position of the gripping arm is made possible.

After the failure has been remedied, the horizontal conveying device can restart in a self-acting manner in method step S7 such that the previously interrupted handling process and/or position changing process can be continued unchanged and without manual intervention. After the initialization of the handling device, each commenced work cycle interrupted by the occurred failure event can in this way be continued and completed (method step S8) at reduced speed of the horizontal conveying device and/or handling device.

The schematic top view of FIG. 2 illustrates an assembly of a plurality of piece goods 2 as layer 12, such as it is to be assembled, for example, for palletizing and further processing. In the illustrated exemplary embodiment, the piece goods 2 are formed by eight bottles 8 each, which are gathered together in bundles by a shrink film 9 or a strapping tape by adhesive joints as well. This assembly of a plurality of piece goods 2 is also referred to as "group" or "grouping" in the present and following context, with a complete layer 12 referred to as being from a plurality of grouped piece goods 2 within a work cycle of a layer forming process, which is described in more detail below, such that each of these layers 12 having been grouped or, as applicable, assembled in any optional continuing series, forms or comprises, as applicable, in each instance one work cycle of the layer forming process.

The FIGS. 3 to 40 described in more detail below schematically show a temporal sequence of a method according to the invention for handling piece goods 2 moved one after another in two parallel rows 1, 1*a*, 1*b* by a correspondingly equipped handling device 10 for preparing and grouping a layer 12 of piece goods 2 according to FIG. 2.

Figure 41:
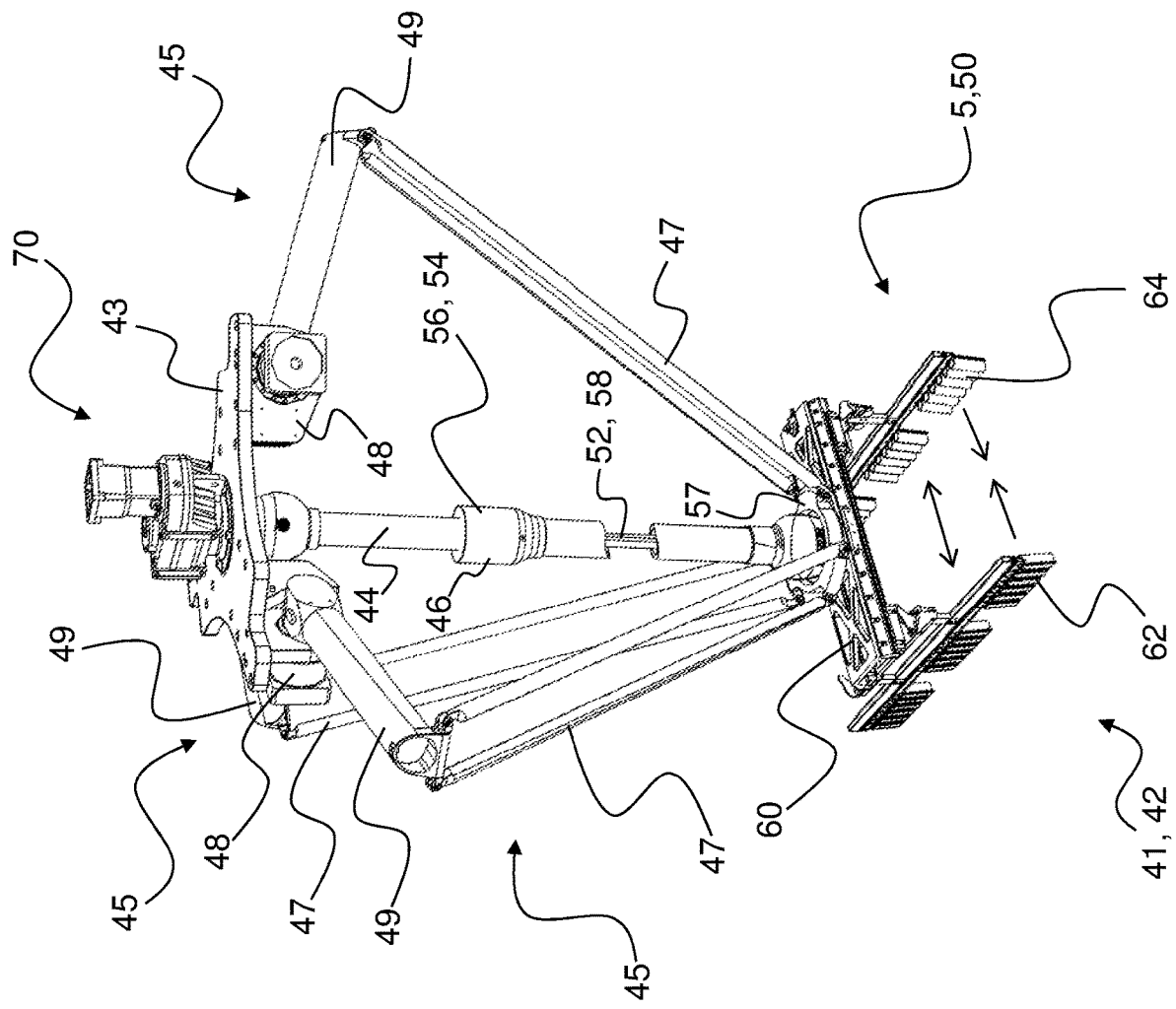
FIG. 41 shows a schematic perspective view of an embodiment of a handling apparatus and/or manipulation apparatus for carrying out a variant or a plurality of variants of the method according to the invention.

FIG. 41 shows a schematic perspective view of an embodiment of a handling apparatus and/or manipulation apparatus for carrying out a variant or a plurality of variants of the method according to the invention.

The assembly for grouping the piece goods 2, generally referred to in the figures described below as handling device 10, in the present exemplary embodiment comprises two parallely disposed first transport devices 3, 3*a*, 3*b*, by which immediately consecutive piece goods 2 in two parallel rows 1, 1*a*, 1*b* can be transported in each instance interruption-free and/or at continuous transport speed v3 into a seizing range 4 of at least one movable, shiftable, and/or rotatable manipulator 5 of the handling device 10. In particular, it is provided that exactly one seizing range 4 of a manipulator 5 of the handling device 10 is assigned to the two parallel first transport devices 3*a*, 3*b*. The transport devices 3*a*, 3*b* are each formed, for example, by a conveyor belt or another suitable conveying device on which the piece goods 2 are transported preferably in one row, where no or, as applicable, only a minor process-related space exists between in each instance directly consecutive piece goods 2. In each of the rows 1*a*, 1*b*, the piece goods 2 thus arrive continuously in the seizing range 4 of the one manipulator 5 in each instance in a so-called closed formation F, Fa, Fb, as is illustrated in the FIG. 3 *ff* and discernible particularly well in the FIGS. 3 to 8.

The FIGS. 3 to 40 in particular illustrate the transport, continued unspaced in transport direction TR, of the rows 1, 1*a*, 1*b* or formations F, Fa, Fb, as applicable, in the seizing range 4 of the handling device 10. In particular, the piece goods 2 of the particular row 1*a*, 1*b* are further transported in the seizing range 4 without interruption and at unchanged transport speed. A horizontal conveying device 6 moving at a speed v6 is assigned to the seizing range 4. In particular, the speed v6 of the horizontal conveying device 6 corresponds to the transport speed v3 of the transport devices 3*a*, 3*b*. The piece goods 2 arriving in parallel rows 1*a*, 1*b* via the transport devices 3*a*, 3*b* are pushed over onto the horizontal conveying device 6 and are further conveyed there without interruption by the back pressure of the subsequent piece goods 2.

It is furthermore possible that the piece goods 2 are transported to the seizing range 4 of the manipulator 5 in multiple rows, in particular in a plurality of parallel rows 1*a*, 1*b* on one single, common transport device 3 (not illustrated here). The parallel rows 1*a*, 1*b* can in this instance be transported on the transport device 3 spaced apart from each other or largely without spaces from each other.

The horizontal conveying device 6 and the at least one manipulator 5 disposed above the horizontal conveying device 6 are also referred to together as grouping module 20 of the handling device 10.

The manipulator 5 is designed for receiving piece goods 2, 2* in a clamping and/or force-locking and/or form-locking manner within the seizing range 4. As illustrated in FIG. 8, the manipulator 5 can first, for example, pick off and seize an individual piece good 2 from the closed formation Fa arriving via the transport device 3*a*. The piece goods 2 seized by the manipulator 5 are generally referred to below with the reference character 2* for the purpose of distinguishing them from the piece goods 2 disposed in the formation F. The manipulator 5 separates the seized piece good 2* from the single-row formation Fa and transfers the separated piece good 2* into a first target position P1 and/or, after a performed rotation, into a target alignment, as illustrated in the FIGS. 8 to 12. In this context, the seized piece good 2* is, on the one hand, spaced apart in transport direction TR from the formation Fa of piece goods 2 by the manipulator 5; in addition, the seized piece good 2* is rotated relative to the piece goods 2 of the formation Fa.

According to the method steps illustrated in the FIGS. 8 to 12, the at least one piece good 2 arriving foremost can be seized from the closed formation Fa and brought into the specified relative target position P1 and/or target alignment relative to the subsequent piece goods 2 of the formation Fa under simultaneous rotary movement by an angle of, for example, approximately 180°. The rotary movement is in this context normally carried out about an approximately vertical axis located between the particular at least one piece good 2* seized in a clamping and/or force-locking and/or form-locking manner and the target position P1.

As shown in the FIG. 20 *ff*, the manipulator 5 can optionally also seize and shift and/or rotate two or three piece goods 2 at the same time. The manipulator movements shown in the presently described figures are to be understood as examples; and they can serve in the manner shown or also in a different manner.

For the manipulator 5 that is asymmetrically loaded with only one piece good 2, 2* according to FIG. 8, it may be advantageous that the manipulator 5 does not shift the piece good 2, 2* by an acceleration in transport direction TR in order to space it apart in an alignment from the formation Fa. Instead—as illustrated in the FIGS. 9 to 12—, the manipulator 5 carries out a 180° rotation about an axis of rotation formed perpendicular to the horizontal support surface of the horizontal conveying device 6. The seized piece good 2, 2* is thereby conveyed into a desired target position P1, which is located spaced apart in an alignment upstream from formation Fa (cf. FIG. 12). In order to precisely adjust the specified target position P1, a shift of the manipulator 5 in transport direction TR or opposite to the transport direction TR additionally overlaps this rotation of the manipulator 5. A brief acceleration of the manipulator 5 is carried out in transport direction TR prior to the rotation setting in in order to prevent a collision of the manipulator 5 and the piece goods 2, 2* seized by the manipulator with the subsequent piece goods 2 of the formation Fa.

Due to these optional rotations of the manipulator 5, in many instances no or only a very minor movement in or opposite to the transport direction TR has to be carried out by the manipulator 5. This is advantageous because the manipulator does not subsequently have to cover this path distance in the opposite direction in order to pick off further piece goods 2 from one of the arriving formations Fa, Fb. A further advantage of such rotations, in particular by 180°, lies therein that the manipulator 5 is already available in a configuration where it can immediately seize further piece goods 2 without having to first carry out a return rotation into an initial position. That is to say that in the subsequent method step it is now possible to pick off further piece goods 2 with the manipulator 5 gripper arms that were not loaded in the described method step of the 180° rotation. This aspect also leads to a noticeable saving of time and thus to an increased throughput in product processing.

As illustrated in FIG. 13, the manipulator 5 disengages from the piece good 2* that has been conveyed to the target position P1 in order to then pick off a piece good 2, 2* from the arriving formation Fb, as illustrated in the FIGS. 14 to 18, and to convey it under rotation into a target position P2 and a corresponding target alignment. In this context, the transported piece good 2* is brought into the specified relative target position P2 and/or target alignment relative to the subsequent piece goods 2 of the formation Fb under simultaneous rotary movement by an angle of at least approximately 90°. In this context again, a rotary movement about a preferably approximately vertical axis is carried out, in which instance the axis of the rotary movement is additionally moved toward the specified target position P2, at least intermittently and/or in sections in the course of the rotary movement. It can be particularly provided that the axis is moved at least intermittently in the course of the rotary movement toward the particular specified target position P2 at a speed that is greater than the transport speed v3 of the arriving closed formation F. Alternatively or additionally, it can be provided that the axis remains in a specific position at least intermittently in the course of the rotary movement.

As illustrated in the FIGS. 18 and 19, the manipulator 5 disengages from the piece good 2* that has been conveyed to the target position P2 in order to then pick off two piece goods 2, 2* from the arriving formation Fa, as illustrated in the FIGS. 20 to 22, and to convey these under rotation into a target position P3 and a corresponding target alignment.

In the FIGS. 23 to 27, it is illustrated that the manipulator 5 then moves to the arriving closed formation Fa again and grips the two foremost piece goods 2, 2* therefrom and conveys these piece goods 2, 2*—according to the FIGS. 28 to 30—under rotation into a target position P4 and a corresponding target alignment on the horizontal conveying device 6.

A temporary system interruption can now be illustrated according to the FIG. 30 and the following Figures on the basis of an occurring failure event, as it can occur, for example, with an interruption of the electric power supply. Such a failure event involves at least an at least temporary standstill of the horizontal conveying device 6, of the upstream-disposed transport devices 3, 3a, 3b, as well as of the entire handling device 10 together with the manipulator 5, since these lack a power supply for their particular drives. In such an instance, the entire handling device 10 is reinitialized, which among other things includes that the manipulator 5 disengages from piece goods 2, 2* if such are still left between the manipulator 5 gripper arms, and that the manipulator 5 is moved into a start position, as indicated in FIG. 31. This start position can be in nearly any location, also, for example, centered relative to the seizing range 4, also optionally at the edge of the seizing range 4. During this initialization, the transport devices 3, 3a, 3b and the horizontal conveying device 6 first remain standing still, such that both the speed v3* of the transport devices 3, 3a, 3b and the speed v6* of the horizontal conveying device are in each instance zero (v3*=0 and v6*=0).

Only after the failure has been remedied or, as applicable, after restoring the power supply, the transport devices 3, 3a, 3b slowly restart at reduced speed v3* (v3*<v3), while the horizontal conveying device 6 also slowly restarts at reduced speed v6* (v6*<v6). As above, it can apply in this context that the reduced speeds v3* and v6* approximately correspond, since the piece goods 2 supplied on the transport devices 3, 3a, and 3b are preferably not supposed to be banked up at the horizontal conveying device 6.

As the entire grouping process is supposed to restart in a self-acting manner and the previously interrupted handling process and/or position changing process for the piece goods 2 is supposed to be continued without manual interventions after the failure has been remedied, the handling device 10 continues the previously interrupted handling process and/or positioning process for the piece goods 2 at the point of interruption after the initialization has been performed. In this so-called repair mode or restart mode, it is for this purpose necessary that stored position values of all piece goods 2 and 2*, as well as position values for all movable parts of the handling device 10, including the manipulator 5, can be retrieved after the initialization of the handling device 10 to allow a continuation of the previously interrupted positioning process. After the initialization of the handling device 10, each commenced work cycle interrupted by the occurred failure event can in this way be continued and completed, preferably at reduced speeds v3* and v6* of the transport devices 3, 3a, 3b and of the horizontal conveying device 6 and at correspondingly reduced positioning speeds of the manipulator 5.

The position values P1, P2, P3, etc. of the piece goods 2, 2* on the horizontal conveying device 6 can be determined by corresponding queries of the previously performed and stored movement curves of the manipulator 5 also additionally by optical sensors and/or by an image processing equipped for this purpose and covering the seizing range 4. The same applies to the piece goods 2 entering into the seizing range 4 and still partly located on the transport devices 3, 3a, 3b, which piece goods 2 can preferably likewise be detected optically and/or by suitable sensors. It is moreover important that, after the failure has been remedied and after the initialization has been performed, the handling device 10 can determine the exact position of the manipulator 5 in the seizing range 4 by a query of the signal values from absolute encoders assigned to the manipulator 5 in order to bring this position into relation with the status of the grouping process and the positions of the piece goods 2, 2* already positioned and those still left to be positioned and in order to be able to continue the process flows and/or movement patterns interrupted by the failure event in the in each instance interrupted phase.

The FIG. 32 illustrates the return movement of the manipulator 5 to the piece goods 2 to be seized in the next process phase, while the speeds v6* of the horizontal conveying device 6 as well v3* of the transport devices 3, 3a, 3b are preferably in each instance zero. After the desired seizing position of the manipulator 5 has been reached (FIG. 33), the process can slowly restart, this also being indicated by the reduced speeds v6* (v6*>0) of the horizontal conveying device 6 as well as v3* (v3*>0) of the transport devices 3, 3a, 3b. The interrupted gripping and shifting process can be completed at the point of interruption by again gripping and shifting the piece goods 2, preferably still at reduced speeds v3* and v6* (cf. FIG. 34), whereupon the completed gripping and shifting process can be succeeded by the gripping and shifting process that follows next in the layer forming process (cf. FIGS. 35 to 38).

The further layer forming processes in this cycle can run up to the formation of the finished layer 12 (cf. FIG. 2) preferably at still reduced speeds v3* and v6*, to the point when the subsequent cycle can run at the original speeds v3 and v6 again, with these speeds v3 and v6 being greater than the reduced speeds v3* and v6* in the repair mode or, as applicable, in the clearing mode.

After further manipulation steps (not shown here), the target layer 12 already illustrated in FIG. 2 can have become largely prepared as loose arrangement according to FIG. 40. By pushing together the arrangement with suitable sliders, the desired closed layer 12 is produced in a further, non-illustrated method step, which layer 12 can be transferred, for example, onto a pallet for further processing.

In the described manipulation steps, the seized piece goods 2* are in each instance preferably transferred, pushed, and/or rotated in one single, in particular, interruption-free manipulation step into the target position P1 to P8 and/or target alignment. In this context, it can be provided that the manipulator 5, for example, lifts up the seized piece goods 2*, conveys them to a target position P1 to P8, and deposits them on the horizontal conveying device 6 within the seizing range 4. It can be alternatively provided that the manipulator 5 shifts the piece goods 2* on the horizontal conveying device 6 by applying, in particular, a velocity component and/or a direction component and/or a rotation component to the piece goods 2* that have been picked off. In particular when simultaneously shifting piece goods seized by the manipulator 5 and at least one further piece good 2 being in surface contact therewith, substantially no lifting of the seized piece goods 2* is provided. Instead, these piece goods are only shifted on the horizontal conveying device 6.

The target positions P1 to P8 in each instance represent a relative position relative to the formation Fa or Fb, as applicable. As the transport devices 3a, 3b and thus the formations Fa, Fb move at the same speed as the horizontal conveying device 6, the relative space between the piece goods 2* in their particular target position P1 to P8 and a piece good 2 of the formations Fa, Fb not yet seized by the manipulator 5 always remain the same in the further procedure, although all piece goods 2, 2* continuously move on.

In the time slot between the seizing of piece goods 2* by the manipulator 5 the release thereof in the particular target position P1 to P8, the speed of the manipulator 5 is increased relative to the transport speed v3 of the formations Fa, Fb. The movement direction of the manipulator 5 when conveying the piece goods 2* of the formation F into a target position P1 to P8 results, for example, from a first movement component parallel to the transport direction TR of the formation Fb and a second movement component perpendicular to the transport direction TR of the formation F. Thereby, the piece goods 2* seized by the manipulator 5 can be moved into a specified target position in the seizing range 4 of the manipulator 5, the target position being located spaced apart in transport direction TR in front of the formation F and laterally offset relative to the formation F. If the second movement component perpendicular to the transport direction TR of the formation F equals zero, the seized piece goods 2* are shifted into a position that is located in alignment with the particular formation F (cf. FIGS. 31 and 32, for example)

It can be furthermore provided that the manipulator rotates about an axis of rotation formed to be perpendicular to the plane of the horizontal conveying device 6 and thereby effects a corresponding repositioning of the seized piece goods 2*. Depending on whether additional movement components are applied to the manipulator 5, the piece goods 2* moved in such a manner are disposed in an alignment with the particular formation F (cf. FIGS. 8 to 12), or they are disposed laterally offset relative thereto.

According to a further non-illustrated embodiment, it can be provided that the manipulator 5—after shifting a group of seized piece goods 2* and at least one piece good 2 not seized by the manipulator 5, which non-seized piece good 2 is in surface contact with a seized piece good 2*—disengages from the group, then again seizes at least one piece good 2, 2* of this group, and rotates it and/or shifts it, or the like, relative to the group.

It is also possible to use a manipulator 5 with seized piece goods 2* for shifting at least one piece good 2, which has already been disposed in a target position in a previous step, into a new target position by surface contact between the piece good 2* seized by the manipulator 5 and the piece good 2, which has already been disposed on the horizontal conveying device 6 in a first target position. The manipulator 5 subsequently releases the seized piece good 2* in the new target position such that a surface contact between the piece good 2 already disposed in a target position in a previous step and the further piece good 2* is maintained.

During the positioning of the piece goods 2* seized by the manipulator 5, the at least one transport device 3 and the horizontal conveying device 6 continue to be operated constantly.

In this context, the speed v3, v6 is selected such that the manipulator 5 has sufficient time, within its available operating range, to shift the piece goods 2*. Preferentially, the manipulator 5 consists of a delta kinematic robot (cf. FIG. 41) in order to realize highly dynamic shifting movements and to enable cycle times to be as fast as possible.

If a manipulator 5 is generalizingly referred to in the present instance or generally in the context of the present invention, this part of the manipulator 5 provided for the transfer of at least one piece good 2, 2* to the target position P and/or target alignment, can concretely be, for example, a tool head, a gripper head, or the like, which is, for example, attached and mounted on movably mounted cantilever arms, which in turn are typically mounted in a frame-fixed manner on a frame or the like. Such a manipulator suspension or manipulator arrangement, as applicable—also known as parallel kinematic arrangement—enables the desired movability of the head (also: of the manipulator 5), which can seize, shift, position, place, rotate, etc. the piece goods 2, 2* in the desired manner for moving toward the particular target positions P and/or target alignments for the piece goods 2, 2*. Other suitable manipulator configurations are, however, also conceivable, for example, such as are carried out with gantry robot guidings or the like. These other manipulator configurations can optionally relate to individual, several, or all embodiment variants mentioned in the context of the present description of figures and/or of the entire description of the invention.

The FIGS. 3 to 41 show different views of an embodiment of a manipulator 5, 50 of a handling device 10 and/or manipulation apparatus (according to one of the previous figures) for carrying out a variant or a plurality of variants of the method according to the invention. The FIG. 41 thus shows a schematic perspective view of the apparatus or, more precisely, of a delta kinematic robot. It should be pointed out here that the embodiment variant of the apparatus for carrying out at least some variants of the method according to the invention as exemplarily explained in the FIG. 41 relates to a delta robot, a so-called tripod, or to a delta kinematic robot with three swivel arms of the same type, as applicable, which can form a part of a handling device or of a manipulator 5, as applicable, for handling, rotating, shifting, or receiving articles, piece goods 2, or bundles, or which can contain this handling device or this manipulator, as applicable. In terms of a possible design for the delta robot or tripod, as applicable, of its construction, its mode of operation, and its movement range, the disclosure of DE 10 2013 106 004 A1 is referred to, with reference hereby being made to the full content of the disclosure. A detailed description of the movement modes, the drives for the three swivel arms, etc. is therefore dispensed with at this point. The apparatus 41 according to FIG. 41 could generally also have four positioning arms of the same type.

The robot forming or, as applicable, containing the apparatus 41, which robot at the same time contains or comprises a part of the handling device 10 or the manipulator 5, as applicable, or can form a part thereof, as applicable, is in the following generally referred to by the reference character 42. It should be noted that the robot referred to by the reference character 42 can also be referred to as delta robot 42, as delta kinematic robot 42, as parallel kinematic robot 42, or also as tripod 42 (cf. FIG. 41 in this connection).

The FIG. 41 shows a schematic perspective view of an embodiment of an apparatus 41 or of a delta kinematic robot 42, as applicable, for carrying out the method according to the invention. The apparatus 41 or the delta kinematic robot 42, as applicable, is configured to grip, rotate, and relocate beverage containers, which have been assembled to bundles and which are not illustrated in FIG. 41. The apparatus 41 or the delta kinematic robot 42, as applicable, can however be used likewise for gripping, rotating, and relocating any type of articles or piece goods.

As is discernible in FIG. 41, the apparatus 41 or the delta kinematic robot 42, as applicable, has an upper suspension 43. Three positioning arms 45 are fastened to the upper suspension 43, each so as to be rotatable by a particularly assigned drive 48. The rotating movement of the positioning arms 45 in this context is carried out such that their axes of rotation run parallel to each other. Furthermore, the three positioning arms 45 consist of at least two arm sections 47 and 49, which are swivelable relative to each other, with the lower arm sections 47 or lower arms 47 each being formed from two linkages oriented parallel to each other. The upper arm section 49 or upper arm 49 is in each instance linked to its particularly assigned drive 48 or, as applicable, is flange-mounted to its particularly assigned drive 48. In addition, the three positioning arms 45 can be moved independently of one another. For this purpose, all drives 48 are linked to a control unit, which specifies the movement of the positioning arms 45 and controls the drives 48.

At the lower end of the three positioning arms 45, a manipulator 50 is linked to the three positioning arms 45 such that the manipulator 50 can be moved for handling articles by a movement of the three positioning arms 45. The control unit not illustrated in FIG. 41 therefore specifies the movement of the positioning arms 45 depending on a position provided for the manipulator 50 for gripping and handling piece goods 2. All of the three positioning arms 45 are mechanically coupled with a base 60 of the manipulator 50 by a support ring 57. The mechanical connection or coupling between the support ring 57 and the base 60 of the manipulator 50 is formed such as to allow a relative rotation of the manipulator 50 relative to the support ring 57. The support ring 57 can also be referred to as tool center point of the apparatus 41.

The manipulator 50 is non-rotatingly flange-mounted approximately centrally to a linear guide 56, in which instance the linear guide 56 is formed as first shaft 54; and the manipulator 50 can thus be rotated via the first shaft 54.

Furthermore provided is an actuating device 52 formed as second shaft 58, by which clamping jaws 62 and 64 can be controlled to close and open. The axes of rotation of the first shaft 54 as well as of the actuating device 52 formed as second shaft 58 are identical. The first shaft 54 and the second shaft 58 are oriented or disposed coaxially relative to each other. Since the manipulator 50 or, as applicable, the manipulator clamping jaws 62 and 64 that are located opposite each other can be controlled via the actuating device 52 formed as second shaft 58, no pneumatic, hydraulic, or electrical line connections are necessary for connecting to the manipulator 50 for the purpose of controlling the manipulator 50 or, as applicable, the clamping jaws 62 and 64.

Herein lies the advantageous possibility of rotating the manipulator 50 together with the manipulator clamping jaws 62 and 64 via a first shaft 54 by more than 360°, since there are no line connections that would impede a complete rotation. Compared to the apparatuses known from the prior art, the throughput in handling articles can hereby be significantly improved, since the manipulator 50 does not need a return rotation in order to be transferred back into an initial orientation.

As mentioned, the two clamping jaws 62 and 64 in the embodiment shown in FIG. 41 can be relocated relative to each other or also moved toward each other or away from each other by a rotation of the actuating device 52 formed as second shaft 58. In the present context, the particular movement of the clamping jaws 62 and 64 when controlling the actuating device 52 formed as second shaft 58 is indicated by arrow-based illustration. Both clamping jaws 62 and 64 are fastened to the base 60 of the manipulator 50 in a hanging and linearly movable manner. A control of the clamping jaws 62 and 64 is carried out by transmission steps of a gearing mechanism in contact with the second shaft 58, which transmission steps are not discernible in FIG. 45, and which transmit a torque of the second shaft 58 to a positioning movement of the clamping jaws 62 and 64.

The linear guide 56 or the first shaft 54, as applicable, comprises two housing parts 44 and 46, which are telescopically in contact with each other and each provide a hollow space for accommodating the actuating device 52 formed as second shaft 58. The actuating device 52 formed as second shaft 58 is coupled to the manipulator 50 and to an actuator 70 by a cardanic-type joint.

The actuator 70 is positioned non-rotatingly on the upper suspension 43. The actuating device 52 formed as second shaft 58 can be rotatingly moved by the actuator 70, whereby the clamping jaws 62 and 64 of the manipulator 50 are moved for gripping or releasing articles.

Normally, the second shaft 58, which serves for closing and opening the clamping jaws 62 and 64 of the manipulator 50 or of the gripper, as applicable, has to perform a compensatory movement when the gripper or manipulator 50 is rotated by actuation of the first shaft 54. This compensatory movement is carried out as a relative movement relative to the first shaft 54 in same sense (parallel) rotation, in counter rotation, or synchronously. The direction of the compensatory movement is to be carried out according to the desired mode of operation. If the clamping jaws 62 and 64 are closed, for example, by a counterclockwise rotary movement of the second shaft 58, and the manipulator 50 or the gripper, as applicable, is simultaneously rotated counterclockwise by rotation of the first shaft 54, then the second shaft 58 likewise has to perform a counterclockwise rotation when the manipulator 50 rotates in order to prevent an opening of the clamping jaws 62 and 64. A clockwise rotation is to be realized accordingly. The required rotation directions of the shafts 54 and 58 depend on the technical realization of carrying out the rotary movement of the second shaft 58 in a linear movement of the clamping jaws 62 and 64.

Instead of the shown apparatus 41, the manipulator 5 can of course also be formed by a gantry robot gripping or by another suited movable gripper that is capable of carrying out the desired positioning movements for the piece goods 2.

After a failure event, such as the outage of the power supply, it is important to be able to reach and precisely define the initialization positions (cf. FIG. 31). In order to guarantee this, all drives 48 of the robot 42 as well as the actuator 70 are expediently equipped with absolute encoders or other suitable sensors that allow a precise determination of position at each point in time such that the position of the robot 42 can at any given time be brought into relation with the in each instance detected positions P1 to P8 $ff$ of the piece goods 2, 2\* in order to be able to continue the positioning process at the point of interruption after the system interruption has been remedied.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS 1, 1a, 1b Row
2, 2* Piece good, bundle
3, 3a, 3b Transport device
4 Seizing range
5 Manipulator
6 Horizontal conveying device
8 Bottle
9 Shrink film
10 Handling device
12 Layer
20 Grouping module
41 Apparatus
42 Robot, delta robot, delta kinematic robot, parallel kinematic robot, tripod
43 Suspension, upper suspension
44 First housing part
45 Positioning arm
46 Second housing part
47 Lower arm section, lower arm
48 Drive
49 Upper arm section, upper arm
50 Manipulator
52 Actuating member, actuating device
54 Shaft, first shaft, outer shaft, outer first shaft
56 Linear guide
57 Support ring
58 Shaft, further shaft, second shaft, inner second shaft
59 Contact element
60 Base
62 Clamping jaw
64 Clamping jaw
70 Actuator
F, Fa, Fb Formation
P1 to P8 Target position, target positions
TR Transport direction
v3, v3* Transport speed
v6, v6* Speed

The invention claimed is:

1. A method for manipulating or for handling piece goods (2, 2\*) moved one after another in at least one row (1, 1a, 1b) in a transport direction (TR) on a horizontal conveying device (6), comprising:
in each work cycle, seizing at least one transported piece good (2, 2\*) in a clamping or force-locking or form-locking manner from the at least one row (1, 1a, 1b) by at least one handling device (10), spatially separating the seized at least one transported piece good (2,2\*) from the at least one row (1, 1a, 1b), moving the at least one separated piece good (2,2\*) into a specified relative target position (P, P1, P2, P3, P4, P5, P6, P7, P8) or target alignment relative to subsequent piece goods (2, 2\*), and storing all positions or target positions (P, P1, P2, P3, P4, P5, P6, P7, P8) of the piece goods (2, 2\*) located on the horizontal conveying device (6) or located in a seizing range (4) of the handling device (10),
wherein the at least one moved piece good (2, 2\*) is further transported in the transport direction (TR), and
wherein after a failure event causing an interruption in the work cycle, including an at least temporary standstill of the horizontal conveying device (6) or of the handling device (10), initializing the handling device (10),
and wherein, after remedying the failure event, automatically restarting the work cycle and continuing the work cycle from a point at which the work cycle was interrupted,
and wherein, after the failure event has been remedied, retrieving all positions or target positions (P, P1, P2, P3, P4, P5, P6, P7, P8) of the piece goods (2, 2\*).

2. The method of claim 1, wherein the automatically restarting the work cycle comprises automatically restarting the horizontal conveying device (6), and wherein the continuing the work cycle comprises operating the handling device (10) from the point at which the work cycle was interrupted.

3. The method of claim 2, after the failure event has been remedied, operating, for a specified period of time, the horizontal conveying device (6) or the handling device (10) in a repair mode.

4. The method of claim 3, wherein the operating in repair mode step comprises starting at least the horizontal conveying device (6) at a reduced speed (v6*).

5. The method of claim 4, wherein the operating in repair mode step further comprises starting the handling device (10) at a reduced positioning speed.

6. The method of claim 5, wherein, after initializing the handling device (10), the retrieving step further comprises retrieving at least one position of the handling device.

7. The method of claim 6, after initializing the handling device (10), further comprising continuing or completing each work cycle.

8. The method of claim 7, wherein, after the failure event has been remedied and after initializing the handling device (10), the handling device (10) queries signal values from absolute encoders assigned to movable sections of the handling device (10).

9. The method of claim 7, wherein, during the operating in repair mode step, detecting the positions or target positions (P, P1, P2, P3, P4, P5, P6, P7, P8) of all piece goods (2, 2\*) by image processing.

10. The method of claim 7, wherein, in the repair mode, detecting the positions and/or target positions (P, P1, P2, P3, P4, P5, P6, P7, P8) of all piece goods (2, 2*) by at least one sensor movable parallel to the horizontal conveying device (6).

11. A handling system for manipulating or for handling piece goods (2, 2*) during a work cycle comprising:
- a horizontal conveying device (6) that conveys piece goods (2, 2*) one after another in at least one row (1, 1a, 1b) in a transport direction (TR),
- at least one handling device (10) spatially assigned to the horizontal conveying device (6), wherein the at least one handling device (10) seizes at least one piece good (2, 2*) in a clamping or force-locking or form-locking manner, and spatially separates the at least one seized piece good (2, 2*) from the row (1, 1a, 1b), and moving the at least one seized piece good (2, 2*) into a specified relative target position (P, P1, P2, P3, P4, P5, P6, P7, P8) or target alignment relative to subsequent piece goods (2, 2*), and
- a control system that monitors movement of the horizontal conveying device (6) and seizing, separating, and transferring movements of the at least one handling device (10), and that controls the at least one handling device (10) and the horizontal conveying device (6) to form palletizable layer arrangements (12) of a plurality of shifted and repositioned or realigned piece goods (2, 2*),
- wherein a plurality of control routines are stored in the control system, and the plurality of control routines a) identify the occurrence of failure events that create at least temporary standstills of the horizontal conveying device (6) or of the handling device (10), b) reinitialize the handling device (10), c) continue the seizing, separating, and moving movements of the at least one handling device (10), and d) restarting the horizontal conveying device (6) after the failure event has been remedied.

12. The handling system of claim 11, wherein, after reinitializing the handling device (10), the plurality of control routines automatically continue the seizing, separating, and transferring movements of the at least one handling device (10) from a point at which the work cycle was interrupted.

13. The handling system of claim 12, further comprising a sensor system that a) detects and stores all positions of the piece goods (2, 2*) located on the horizontal conveying device (6) or located in a seizing range (4) of the handling device (10), and b) transmits all positions of the piece goods (2, 2*) located on the horizontal conveying device (6) or located in a seizing range (4) of the handling device (10) to the control system, wherein positions of the piece goods (2, 2*) are retrievable for automatically continuing the seizing, separating, and transferring movements of the at least one handling device (10).

14. The handling system of claim 13, wherein the sensor system further comprises one or more absolute encoders assigned to at least a selection of movable sections of the handling device (10), wherein the one or more absolute encoders transmit positions of the piece goods (2, 2*) located on the horizontal conveying device (6) or located in a seizing range (4) of the handling device (10) to the control system.

15. The handling system of claim 14, wherein the at least one handling device (10) comprises a parallel kinematic robot (42) with at least one controllable gripping arm for seizing one or more piece goods (2, 2*), wherein parallel kinematic robot has a movement range (4) spatially assigned to the at least one horizontal conveying device (6).

* * * * *